United States Patent
Ochiai et al.

(10) Patent No.: US 11,778,061 B2
(45) Date of Patent: Oct. 3, 2023

(54) FEATURE EXTRACTION DEVICE AND STATE ESTIMATION SYSTEM

(71) Applicant: NTT DOCOMO, INC., Chiyoda-ku (JP)

(72) Inventors: Keiichi Ochiai, Chiyoda-ku (JP); Naoki Yamamoto, Chiyoda-ku (JP); Takashi Hamatani, Chiyoda-ku (JP); Yusuke Fukazawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 17/609,879

(22) PCT Filed: Apr. 30, 2020

(86) PCT No.: PCT/JP2020/018349
§ 371 (c)(1),
(2) Date: Nov. 9, 2021

(87) PCT Pub. No.: WO2020/230658
PCT Pub. Date: Nov. 19, 2020

(65) Prior Publication Data
US 2022/0217214 A1   Jul. 7, 2022

(30) Foreign Application Priority Data

May 13, 2019   (JP) ................. 2019-090579

(51) Int. Cl.
*H04L 67/306* (2022.01)
*H04L 67/50* (2022.01)
*G06F 11/34* (2006.01)

(52) U.S. Cl.
CPC ........ *H04L 67/535* (2022.05); *G06F 11/3476* (2013.01); *H04L 67/306* (2013.01)

(58) Field of Classification Search
None
See application file for complete search history.

(56) References Cited

U.S. PATENT DOCUMENTS

2011/0319094 A1* 12/2011 Usui .................. H04W 4/20
455/456.1
2015/0112891 A1* 4/2015 Watanabe .............. G06N 5/048
706/1

(Continued)

FOREIGN PATENT DOCUMENTS

JP   2016-154019 A   8/2016

OTHER PUBLICATIONS

International Preliminary Report on Patentability and Written Opinion of the International Searching Authority dated Nov. 25, 2021 in PCT/JP2020/018349 (submitting English translation only), 6 pages.

(Continued)

*Primary Examiner* — James A Edwards
(74) *Attorney, Agent, or Firm* — Oblon, McClelland, Maier & Neustadt, L.L.P.

(57) ABSTRACT

A feature extraction device is a device that extracts a feature quantity to be input to a state estimation model for estimating a state related to a terminal where the activity is executed or a user of the terminal, which includes an acquisition unit that acquires activity history information indicating an execution history of the activity in a specified period of time and including time-series activity logs, an extraction unit that extracts co-occurrence relationship information indicating a co-occurrence relationship of activities in a specified period of time based on the activity history information, a generation unit that aggregates activity feature quantities indicating a feature of each activity based on the co-occurrence relationship information and generates an activity history feature quantity indicating a feature of the activity history information, and an output unit that outputs the (Continued)

activity history feature quantity as a feature quantity to be input to the state estimation model.

10 Claims, 15 Drawing Sheets

(56) References Cited

U.S. PATENT DOCUMENTS

2016/0034822 A1* 2/2016 Mariano ............ G06F 11/3447
 706/52
2016/0321352 A1* 11/2016 Patel .................... G06F 16/1734
2017/0339069 A1* 11/2017 Larsson ................ G06F 9/5072

OTHER PUBLICATIONS

International Search Report dated Aug. 24, 2020 in PCT/JP2020/018349 filed Apr. 30, 2020, 2 pages.

* cited by examiner

Fig.3

| UID | DATE AND TIME | EVENT FLAG | APPLICATION | ACTIVITY |
|---|---|---|---|---|
| 1 | 2016/8/1 8:00 | 1 | home | home.HomeActivity |
| 1 | 2016/8/1 8:00 | 1 | carriermail | carriermail.MailListActivit |
| 1 | 2016/8/1 8:10 | 2 | carriermail | carriermail.MailListActivit |
| 1 | 2016/8/1 8:10 | 1 | incallui | incallui.InCallActivity |
| 1 | 2016/8/1 8:15 | 2 | incallui | incallui.InCallActivity |
| 1 | 2016/8/1 8:15 | 1 | home | home.HomeActivity |
| 1 | 2016/8/1 8:20 | 2 | home | home.HomeActivity |
| 1 | 2016/8/1 8:20 | 1 | calendar | calendar.MainActivity |
| ... | ... | ... | ... | ... |

```
1  h_v^0 ← x_v, ∀v ∈ 𝒱 ;
2  for k = 1...K do
3  │  for v ∈ 𝒱 do
4  │  │   h_{N(v)}^k ← AGGREGATE_k({h_u^{k-1}, ∀u ∈ N(v)});
5  │  │   h_v^k ← σ(W^k · CONCAT(h_v^{k-1}, h_{N(v)}^k))
6  │  end
7  │  h_v^k ← h_v^k / ‖h_v^k‖_2, ∀v ∈ 𝒱
8  end
9  z_v ← h_v^K, ∀v ∈ 𝒱
```

| DATE AND TIME | APPLICATION | ACTIVITY |
|---|---|---|
| 2016/8/1 8:00 | home | home.HomeActivity |
| 2016/8/1 8:00 | carriermail | carriermail.MailListActivity |
| 2016/8/1 8:10 | incallui | incallui.InCallActivity |
| 2016/8/1 8:15 | home | home.HomeActivity |
| 2016/8/1 8:20 | calendar | calendar.MainActivity |
| 2016/8/1 9:00 | home | home.HomeActivity |
| : | : | : |

(b)

(a)

| DATE AND TIME | APPLICATION | ACTIVITY | MESH CODE |
|---|---|---|---|
| 2016/8/1 8:00 | home | home.HomeActivity | 53394509 |
| 2016/8/1 8:00 | carriermail | carriermail.MailListActivity | 53394509 |
| 2016/8/1 8:10 | incallui | incallui.InCallActivity | 53394509 |
| 2016/8/1 8:15 | home | home.HomeActivity | 53394509 |
| 2016/8/1 8:20 | calendar | calendar.MainActivity | 53394509 |
| 2016/8/1 9:00 | home | home.HomeActivity | 53394518 |
| : | : | : | |

(b)

FEATURE EXTRACTION DEVICE AND STATE ESTIMATION SYSTEM

TECHNICAL FIELD

The present invention relates to a feature extraction device and a state estimation system.

BACKGROUND ART

A technique of estimating a user's state based on an application usage history in a mobile terminal owned by the user is known. In such a technique, a basic statistic such as the number of starts of an application has been used for estimation. Further, a technique of estimating a user's state by receiving data associated with an activity already performed or currently performed in a user's device and analyzing the received data is known (for example, see Patent Literature 1).

CITATION LIST

Patent Literature

PTL1: Japanese Unexamined Patent Publication No. 2016-154019

SUMMARY OF INVENTION

Technical Problem

In the related art, information used for a user's state is a basic statistic such as the number of starts of an application, which does not include information such as the sequence of using applications and the correlation between applications. Thus, the accuracy of estimating a user's state has been not high enough.

The present invention has been accomplished to solve the above problem and an object of the present invention is thus to improve the estimation accuracy of a user's state based on information acquired by a terminal.

Solution to Problem

To solve the above problem, a feature extraction device according to one embodiment of the present invention is a feature extraction device for extracting a feature quantity indicating a feature related to an execution history of an activity based on the execution history, the feature quantity being to be input to a state estimation model for estimating a state related to a terminal where the activity is executed or a user of the terminal, the device including an acquisition unit configured to acquire activity history information indicating an execution history of the activity in a specified period of time and including time-series activity logs, an extraction unit configured to extract co-occurrence relationship information indicating a co-occurrence relationship of activities in a specified period of time based on the activity history information, a generation unit configured to aggregate activity feature quantities indicating a feature of each activity based on the co-occurrence relationship information, and generate an activity history feature quantity indicating a feature of the activity history information, and an output unit configured to output the activity history feature quantity as a feature quantity to be input to the state estimation model.

According to the above-described embodiment, co-occurrence relationship information indicating a co-occurrence relationship of activities executed in a specified period of time is extracted based on activity history information. Since an activity is executed in a user's terminal, a state of a terminal or a user of the terminal is reflected on the co-occurrence relationship information. Then, activity feature quantities of activities contained in the activity history information are aggregated based on the co-occurrence relationship information, and thereby an activity history feature quantity where a user's state is accurately reflected and also the user's state is closely represented is generated. Thus, the estimation accuracy of a user's state is improved by using the activity history feature quantity generated in this manner as a feature quantity to be input to the state estimation model.

Advantageous Effects of Invention

The present invention enables the improvement of the estimation accuracy of a user's state based on information acquired by a terminal.

BRIEF DESCRIPTION OF DRAWINGS

FIG. 3 is a view showing the structure of activity history information and an example of data contained in the activity history information.

FIG. 6 is a view showing an algorithm for the generation of a convolutional feature quantity.

DESCRIPTION OF EMBODIMENTS

An embodiment of a feature extraction device according to the present invention is described hereinafter with reference to the drawings. Note that, where possible, the same elements are denoted by the same reference symbols and redundant description thereof is omitted.

Figure 1:
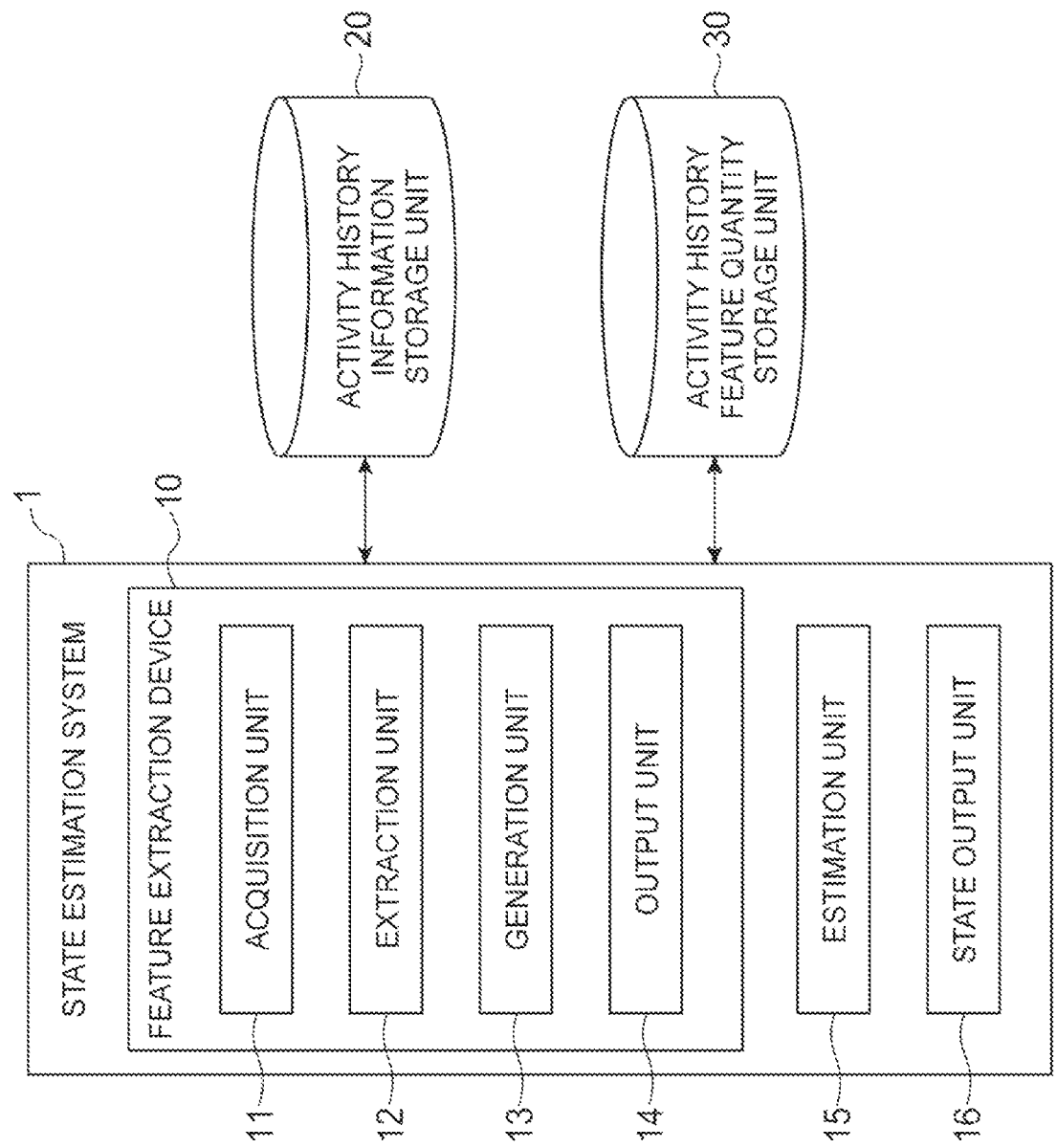
FIG. 1 is a block diagram showing the functional configuration of a state estimation system that includes a feature extraction device according to an embodiment.

FIG. 1 is a view showing the functional configuration of a state estimation system that includes a feature extraction device according to this embodiment. As shown in FIG. 1, a state estimation system 1 includes a state estimation device 10, an estimation unit 15, and a state output unit 16.

The feature extraction device 10 is a device that extracts a feature quantity indicating a feature related to an execution history of activities based on the execution history. The feature quantity extracted by the feature extraction device 10 is a feature quantity to be input to a state estimation model for estimating a state related to a terminal in which an activity is executed or a user of this terminal.

The state estimation system 1 is a system that estimates a state related to a terminal in which an activity is executed or a user of this terminal. To be specific, the state estimation system 1 builds a state estimation model that includes a neural network by deep learning with use of the feature quantity extracted by the feature extraction device 10 and a supervision label indicating a state related to a terminal or a user of the terminal as learning data. Further, the state estimation system 1 outputs state information related to a terminal or a user of the terminal, which is obtained by inputting the feature quantity extracted by the feature extraction device 10 to the learned state estimation model.

The state related to a terminal or a user of the terminal estimated by the state estimation model may be a state of stress of a user of the terminal, demographics, a personality of a user, a user profile or the like, for example.

Estimation of a state related to a user by deep learning based on a history of applications, activities and the like in a terminal used by the user has been performed in related art. In a state estimation method according to related art, a basic statistic such as the number of starts of an application has been used as the feature quantity. The basic statistic, however, is difficult to include a feature such as the sequence of using applications and the correlation between applications.

On the other hand, in the field of language processing, featurization of a character string and a sentence is performed by a method called N-gram. The N-gram is a technique that divides a character string and a sentence into a contiguous sequence of N number of characters, words or the like and uses them as a feature quantity.

By applying a technique in the field of language processing to a technique of estimating a user's state or the like based on a history of applications or the like, featurization of a history of applications or the like can be done by the N-gram, regarding each executed application or the like as a character or a word in language processing, and further regarding consecutively executed applications as corresponding to words that appear consecutively in a sentence or the like.

However, if a history of applications or the like is simply featurized by the technique of N-gram, a generated feature quantity (vector) is sparse because the number of types of application or the like is enormous. This hinders the appropriate execution of deep learning. The feature extraction device 10 according to this embodiment appropriately convolves information of a history of applications or the like and thereby provides a feature quantity suitable for deep learning of a model for estimating a state related to a user.

The functional units 11 to 16 included in the feature extraction device 10 and the state estimation system 1 are configured to be accessible to an activity history information storage unit 20 and an activity history feature quantity storage unit 30.

The feature extraction device 10, the functional units 15 and 16 included in the state estimation system 1, the activity history information storage unit 20, and the activity history feature quantity storage unit 30 may be configured as one device or may be configured as separate devices.

As shown in FIG. 1, the feature extraction device 10 functionally includes an acquisition unit 11, an extraction unit 12, a generation unit 13, and an output unit 14. The functional units 11 to 14 may be configured in one device or may be distributed among a plurality of devices.

The block diagram in FIG. 1 shows blocks of functional units. Those functional blocks (component parts) are implemented by any combination of at least one of hardware and software. Further, a means of implementing each functional block is not particularly limited. Specifically, each functional block may be implemented by one physically or logically combined device or may be implemented by two or more physically or logically separated devices that are directly or indirectly connected (e.g., by using wired or wireless connection etc.). The functional blocks may be implemented by combining software with the above-described one device or the above-described plurality of devices.

The functions include determining, deciding, judging, calculating, computing, processing, deriving, investigating, looking up/searching/inquiring, ascertaining, receiving, transmitting, outputting, accessing, resolving, selecting, choosing, establishing, comparing, assuming, expecting, considering, broadcasting, notifying, communicating, forwarding, configuring, reconfiguring, allocating/mapping, assigning and the like, though not limited thereto. For example, the functional block (component part) that implements the function of transmitting is referred to as a transmitting unit or a transmitter. In any case, a means of implementation is not particularly limited as described above.

Figure 2:
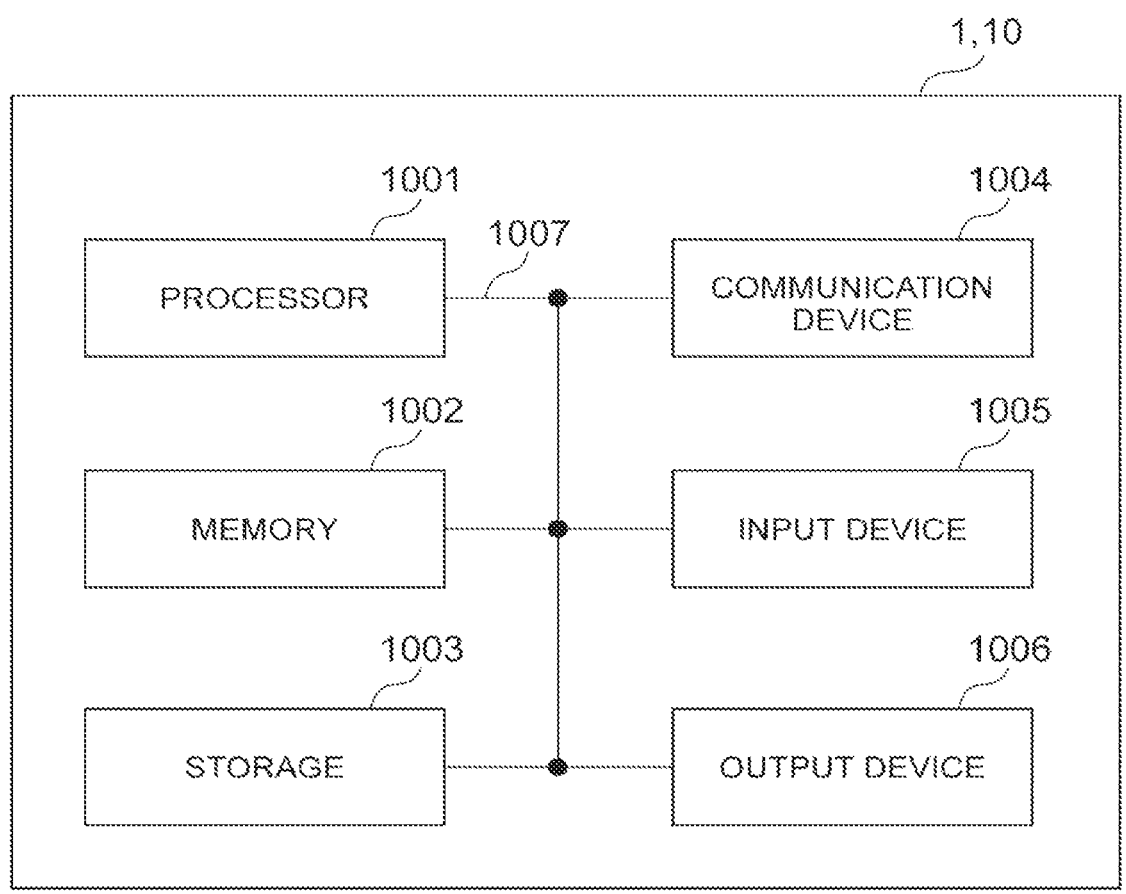
FIG. 2 is a hardware block diagram of the feature extraction device and the state estimation system.

For example, the feature extraction device 10 and the state estimation device 1 according to one embodiment of the present invention may function as a computer. FIG. 2 is a view showing an example of the hardware configuration of the feature extraction device 10 and the state estimation device 1 according to this embodiment. The feature extraction device 10 and the state estimation device 1 may be physically configured as a computer device that includes a processor 1001, a memory 1002, a storage 1003, a communication device 1004, an input device 1005, an output device 1006, a bus 1007 and the like.

In the following description, the term "device" may be replaced with a circuit, a device, a unit, or the like. The hardware configuration of the feature extraction device 10 and the state estimation device 1 may be configured to include one or a plurality of the devices shown in the drawings or may be configured without including some of those devices.

The functions of the feature extraction device 10 and the state estimation device 1 may be implemented by loading predetermined software (programs) on hardware such as the processor 1001 and the memory 1002, so that the processor 1001 performs computations to control communications by the communication device 1004, and reading and/or writing of data in the memory 1002 and the storage 1003.

The processor 1001 may, for example, operate an operating system to control the entire computer. The processor 1001 may be configured as a CPU (Central Processing Unit) that includes an interface with a peripheral device, a control device, an arithmetic device, a register and the like. For example, each of the functional units 11 to 16 shown in FIG. 1 and the like may be implemented by the processor 1001.

Further, the processor 1001 loads a program (program code), a software module and data from the storage 1003 and/or the communication device 1004 into the memory 1002 and performs various processing according to them. As the program, a program that causes a computer to execute at least some of the operations described in the above embodiment is used. For example, each of the functional units 11 to 16 of the feature extraction device 10 and the state estimation device 1 may be implemented by a control program that is stored in the memory 1002 and operates on the processor 1001. Although the above-described processing is executed by one processor 1001 in the above description, the processing may be executed simultaneously or sequentially by two or more processors 1001. The processor 1001 may be implemented in one or more chips. Note that the program may be transmitted from a network through a telecommunications line.

The memory 1002 is a computer-readable recording medium, and it may be composed of at least one of ROM (Read Only Memory), EPROM (ErasableProgrammable ROM), EEPROM (Electrically ErasableProgrammable ROM), RAM (Random Access Memory) and the like, for example. The memory 1002 may be also called a register, a cache, a main memory (main storage device) or the like. The memory 1002 can store a program (program code), a software module and the like that can be executed for implementing a feature extraction method and a state estimation method according to one embodiment of the present invention.

The storage 1003 is a computer-readable recording medium, and it may be composed of at least one of an optical disk such as a CD-ROM (Compact Disk ROM), a hard disk drive, a flexible disk, a magneto-optical disk (e.g., a compact disk, a digital versatile disk, and a Blu-ray (registered trademark) disk), a smart card, a flash memory (e.g., a card, a stick, and a key drive), a floppy (registered trademark) disk, a magnetic strip and the like, for example. The storage 1003 may be called an auxiliary storage device. The above-described storage medium may be a database, a server, or another appropriate medium including the memory 1002 and/or the storage 1003, for example.

The communication device 1004 is hardware (a transmitting and receiving device) for performing communication between computers via a wired and/or wireless network, and it may also be referred to as a network device, a network controller, a network card, a communication module, or the like.

The input device 1005 is an input device (e.g., a keyboard, a mouse, a microphone, a switch, a button, a sensor, etc.) that receives an input from the outside. The output device 1006 is an output device (e.g., a display, a speaker, an LED lamp, etc.) that makes output to the outside. Note that the input device 1005 and the output device 1006 may be integrated (e.g., a touch panel).

In addition, the devices such as the processor 1001 and the memory 1002 are connected by the bus 1007 for communicating information. The bus 1007 may be a single bus or may be composed of different buses between different devices.

Further, the feature extraction device 10 and the state estimation device 1 may include hardware such as a microprocessor, a DSP (Digital Signal Processor), an ASIC (Application Specific Integrated Circuit), a PLD (Programmable Logic Device), and an FPGA (Field Programmable Gate Array), and some or all of the functional blocks may be implemented by the above-described hardware components. For example, the processor 1001 may be implemented with at least one of these hardware components.

The functional units of the feature extraction device 10 and the state estimation device 1 are described hereinafter. The acquisition unit 11 acquires activity history information indicating an execution history of activities for a specified period of time. To be specific, the acquisition unit 11 acquires the activity history information stored in the activity history information storage unit 20. The activity history information contains time-series activity logs. In this embodiment, an activity is a function executed in a terminal, and it may be an application executed in a terminal, one function of an application executed in a terminal, one screen of an application executed in a terminal and the like, for example. Further, the activity may include a context (information about time, place, etc.) where the activity is executed. Further, the activity may include an event that has occurred in a terminal (event of screen on or off, event indicating a charging state, event of WiFi on or off, etc.).

FIG. 3 is a view showing the structure of the activity history information and an example of data contained in the activity history information. As shown in FIG. 3, the activity history information is composed of time-series activity logs. The activity log includes information about a UID, date and time, an event flag, an application, and an activity.

The UID is identification information for identifying a user. The date and time is information indicating time when the activity is executed. The event flag is information indicating a state where the activity is executed. In this embodiment, the event flag "1" indicates that the activity is executed on the forefront screen in the terminal. The event flag "2" indicates that the activity is moved to a screen different from the forefront screen in the terminal. The application is information for identifying an application corresponding to the activity. The activity is information for identifying this activity. In this embodiment, the activity is one function of an application.

The extraction unit 12 extracts co-occurrence relationship information indicating a co-occurrence relationship of activities in a specified period of time based on the activity history information. The co-occurrence relationship of activities in a specified period of time is a relationship indicating whether each of a plurality of activities is executed within the specified period of time. For example, when an activity A and an activity B are executed in a specified period of time, there is a co-occurrence relationship between the activity A and the activity B. In this embodiment, the extraction unit 12 generates, as co-occurrence relationship information, a graph that represents activities as nodes and a co-occurrence relationship between activities as an edge that connects nodes of the activities.

Figure 4:
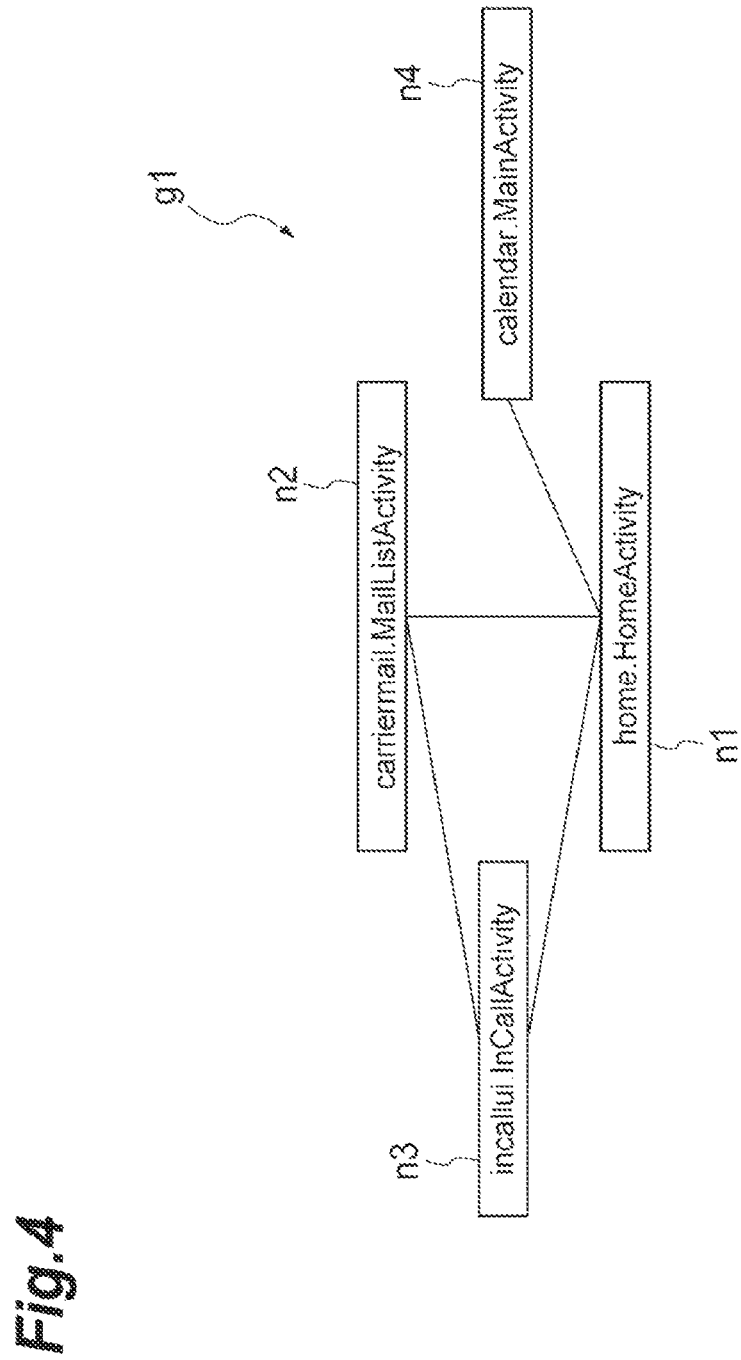
FIG. 4 is a view showing an example of a graph representing co-occurrence relationship information where an activity is a node and a co-occurrence relationship between activities is an edge that connects nodes.

FIG. 4 is a view showing an example of a graph showing co-occurrence relationship information. The graph g1 is the co-occurrence relationship information generated based on the activity history information shown in FIG. 3.

The extraction unit 12 may extract a graph based on all activity logs included in the activity history information.

Alternatively, the extraction unit 12 may extract a graph based on activity logs with which a specified event flag is associated. In the example shown in FIG. 4, the extraction unit 12 generates a graph based on the activity logs with which the event flag "1" is associated among the activity logs in the activity history information shown in FIG. 3. This allows only the activity logs on which a user's state is appropriately reflected to be used for the extraction of the co-occurrence relationship.

The extraction unit 12 may extract the co-occurrence relationship information that contains associating information for associating a plurality of activities executed in a specified period of time with one another. To be specific, the extraction unit 12 extracts all activities executed in a specified period of time that has been set in advance from the execution time of one activity, and sets an edge between each of nodes of the extracted activities and a node of the one activity.

Further, the extraction unit 12 may extract the co-occurrence relationship information that contains transition information indicating a transition relationship of activities executed consecutively in a specified period of time. The transition information is information that, when the executed activity transitions from one activity to another activity, associates the one activity with the another activity. To be specific, when another activity is executed after one activity is executed, the extraction unit 12 sets an edge between a node of the one activity and a node of the another activity. In the graph g1 shown in FIG. 4 according to this embodiment, edges are set based on the transition information. The tendency of execution of activities is thereby appropriately reflected on the co-occurrence relationship information.

Specifically, in the event logs with the event flag "1" in the activity history information shown in FIG. 3, the activity "home.HomeActivity", the activity "carriermail.MailListActivity", the activity "incallui.IncallActivity", and the activity "calender.MainActivity" have a transition relationship, and therefore the extraction unit 12 sets an edge between a node n1 and each of nodes n2, n3 and n4.

Further, the activity "carriermail.MailListActivity" and the activity "incallui.IncallActivity" have a transition relationship, and therefore, the extraction unit 12 sets an edge between the node n2 and the node n3.

Note that, even if there is a transition relationship between activities, the extraction unit 12 may refrain from setting an edge between those activities when the interval of execution is equal to or more than a specified threshold. This prevents setting a co-occurrence relationship between activities that are not relevant to each other in the execution.

The generation unit 13 aggregates activity feature quantities representing the features of activities based on the co-occurrence relationship information, and thereby generates an activity history feature quantity representing the feature of the activity history information. In this embodiment, since the activity history information is represented by a graph where activities are nodes, the generation unit 13 aggregates the activity feature quantities associated with the respective nodes based on the co-occurrence relationship information represented by the graph.

The activity feature quantity is a feature vector with a specified number of dimensions indicating the feature of an activity. The feature vector may be a vector in any form as long as it is a vector to identify an activity, and it may be a vector whose number of dimensions corresponds to the number of types of categories related to an activity, where an element of a category relevant to this activity is 1, and an element of a category irrelevant to this activity is 0. Further, the feature vector may be a vector whose number of dimensions corresponds to the number of types of activities, and it may be a One-Hot vector where only an element relevant to this activity is 1.

To be specific, the generation unit 13 generates a feature quantity that aggregates the activity feature quantity of one activity and the activity feature quantity of one or more activities having a co-occurrence relationship with this one activity by a specified convolution method as a convolutional feature quantity of the one activity, and generates a feature quantity that aggregates convolutional feature quantities of all activities contained in the activity history information by a specified aggregation method as the activity history feature quantity. In this embodiment, the generation unit 13 aggregates the activity feature quantity of a node of one activity and the activity feature quantity of one or more nodes connected with the node of this one activity by an edge by a specified convolution method, and thereby generates the convolutional feature quantity of the node of the one activity.

Further, the generation unit 13 can perform the hierarchical convolution of activity feature quantities in a specified number of layers from a first layer to a k-th layer (k is a predetermined integer of 1 or more) based on the co-occurrence relationship information.

Specifically, when each activity of a plurality of activities having a co-occurrence relationship as indicated by the co-occurrence relationship information is a first activity in the n-th layer (n is an integer of 0 or more), the generation unit 13 defines an activity having a co-occurrence relationship with the first activity as a second activity in the n-th layer, and performs the convolution of the first layer and the convolution of the m-th layer (m is an integer of 2 or more).

In the convolution of the first layer, the generation unit 13 generates a feature quantity generated by convolving the activity feature quantity of the first activity in the 0th layer and the activity feature quantity of one or more second activities in the 0th layer by a specified convolution method as the convolutional feature quantity of the first activity in the first layer.

Further, in the convolution of the m-th layer, the generation unit 13 generates a feature quantity generated by convolving the activity feature quantity of the first activity in the (m−1)th layer and the activity feature quantity of one or more second activities in the (m−1)th layer by a specified convolution method as the convolutional feature quantity of the first activity in the m-th layer.

Figure 5:
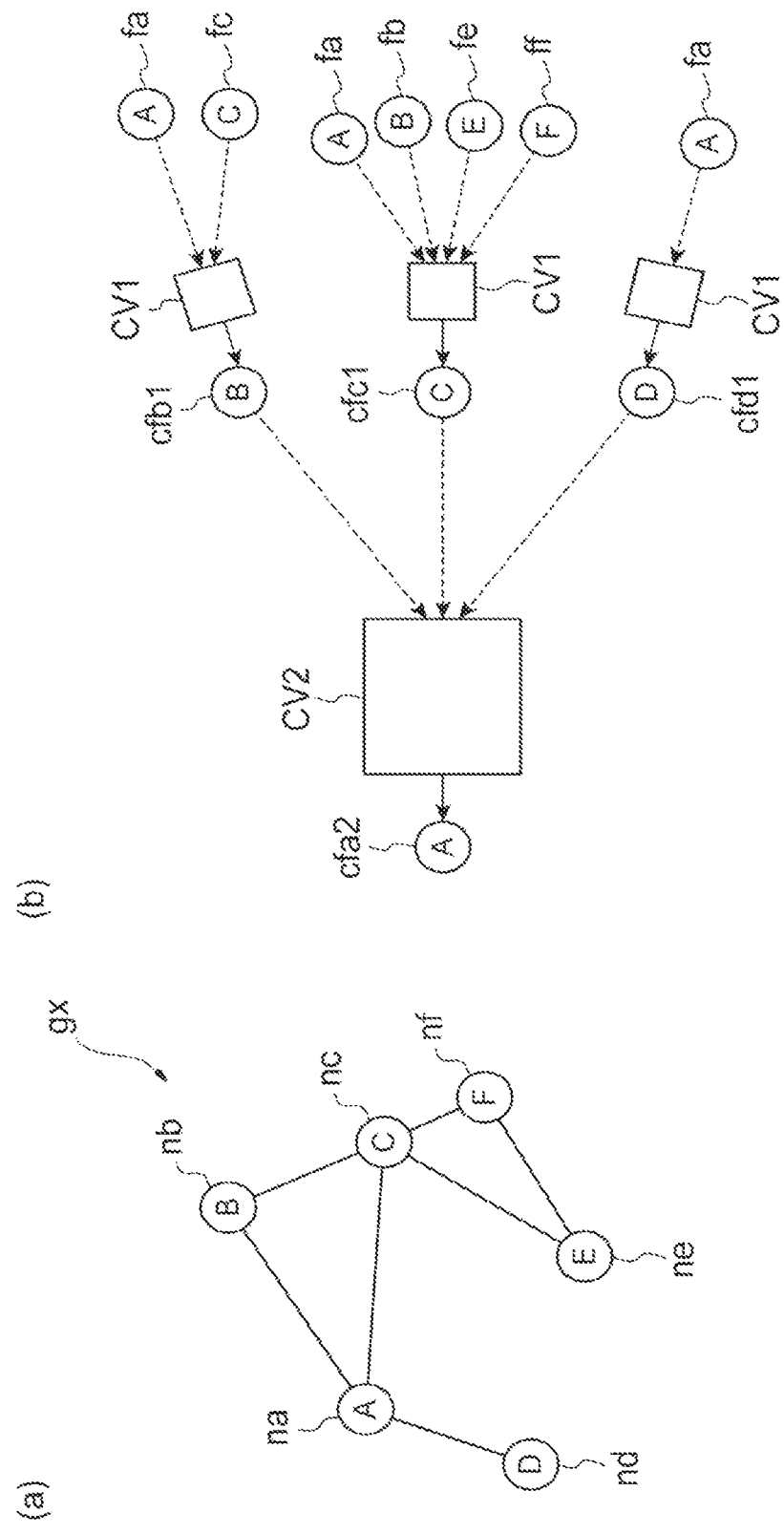
FIG. 5($a$) is a view showing an example of a graph where nodes are represented in an abstract way using alphabet, and FIG. 5($b$) is a view schematically showing hierarchical convolution of activity feature quantities.

Then, the generation unit 13 generates the convolutional feature quantity of the first activity in the k-th layer in the convolution of the k-th layer as the convolutional feature quantity of one activity based on the k-layer convolution Hierarchical convolution of activity feature quantities is described hereinafter with reference to FIG. 5. FIG. 5(*a*) is a view showing an example of a graph where nodes are represented in an abstract way using alphabet. FIG. 5(*b*) is a view schematically showing the hierarchical convolution of activity feature quantities.

The graph gx shown in FIG. 5(*a*) includes nodes A to F (na to nf), and an edge is set between nodes having a co-occurrence relationship. As shown in FIG. 5(*b*), the generation unit 13 generates a convolutional feature quantity cfb of the node B(nb) based on the graph gx. To be specific, because the node B(nb) is connected to the node A(na) and the node C(nc) by edges, the generation unit 13 convolves an activity feature quantity fb of the node B(nb), and an activity feature quantity fa of the node A(na) and an activity feature quantity fc of the node C(nc) by a specified convolution method CV1, and thereby generates a convolutional feature quantity cfb1 of the node B(nb).

Likewise, because the node C(nc) is connected to the node A(na), the node B(nb), the node E(ne), and the node F(nf) by edges, the generation unit 13 convolves the activity feature quantity fc of the node C(nc), and the activity feature quantity fa of the node A(na), the activity feature quantity fb of the node B(nb), an activity feature quantity fe of the node E(ne) and an activity feature quantity ff of the node F(nf) by the specified convolution method CV1, and thereby generates a convolutional feature quantity cfc1 of the node C(nc).

Likewise, because the node D(nd) is connected to the node A(na) by an edge, the generation unit 13 convolves an activity feature quantity fd of the node D(nd) and the activity feature quantity fa of the node A(na) by the specified convolution method CV1, and thereby generates a convolutional feature quantity cfd1 of the node D(nd).

Then, regarding the generation of the convolutional feature quantity cfb1 of the node B(nb), the convolutional feature quantity cfc1 of the node C(nc), and the convolutional feature quantity cfd1 of the node D(nd) as the convolution of one layer, the generation unit 13 generates a convolutional feature quantity of the node A(na) as the convolution in a layer subsequent to the convolution of this one layer. Because the node A(na) is connected to the node B(nb), the node C(nc), and the node D(nd) by edges, the convolutional feature quantity cfb1, the convolutional feature quantity cfc1, and the convolutional feature quantity cfd1 are used as the activity feature quantities of the node B(nb), the node C(nc), and the node D(nd), respectively, in the generation of this convolutional feature quantity. Specifically, the generation unit 13 convolves the activity feature quantity fa of the node A(na), and the convolutional feature quantity cfb1, the convolutional feature quantity cfc1 and the convolutional feature quantity cfd1 by a specified convolution method CV2, and thereby generates a convolutional feature quantity cfa2 of the node A(na).

Although the example shown in FIG. 5(b) is the generation of the convolutional feature quantity of the node A(na) by the two-layer convolution of activity feature quantities, the convolutional feature quantity of each of the nodes other than the node A(na) can be generated in the same manner by the two-layer convolution.

A specific example of the generation processing of the convolutional feature quantity is described hereinafter with reference to FIGS. 6 and 7. FIG. 6 is a view showing an algorithm for the generation of the convolutional feature quantity. The algorithm is composed of lines 1 to 9.

In the line 1, an activity feature quantity $x_v$ of a node v is $h^0_v$. This activity feature quantity corresponds to the activity feature quantity of the 0-th layer.

In the line 2, the processing of the lines 2 to 8 is repeated the number of times corresponding to the number of layers, incrementing the layer number by a variable k, where the number of layers in the hierarchical convolution of activity feature quantities to be performed is K. In the line 3, v identifies a node, and the processing of the lines 3 to 6 is repeated the number of times corresponding to the number V of nodes.

In the lines 4 and 5, the generation unit 13 aggregates the activity feature quantities of one or more second activities having a co-occurrence relationship with the first activity by a specified aggregation method and thereby generates a co-occurrence activity aggregate feature quantity, and combines this co-occurrence activity aggregate feature quantity and the activity feature quantity of the first activity and thereby generates the convolutional feature quantity of the first activity.

To be specific, in the line 4, the generation unit 13 aggregates activity feature quantities $h^{k-1}_u$ (which are convolutional feature quantities in the case of the convolution of the second and subsequent layers) of all adjacent nodes N(v) adjacent to a node u corresponding to the first activity by a specified aggregate function $AGGREGATE_k$ and thereby obtains a co-occurrence activity aggregate feature quantity $h^k_{N(v)}$ of the k-th layer. Note that the generation unit 13 may generate the co-occurrence activity aggregate feature quantity by using any one of the calculation of the average or the sum of the activity feature quantities of the adjacent nodes and the acquisition of the greatest value as the specified aggregate function $AGGREGATE_k$.

In the line 5, the generation unit 13 combines the activity feature quantity of the node v in the (k−1)th layer and the co-occurrence activity aggregate feature quantity $h^k_{N(v)}$ of the k-th layer by a combining function CONCAT, multiplies it by a weighting matrix $W^k$, and further applies an activation function σ, and thereby obtains a convolutional feature quantity $h^k_v$ of the node v of the k-th layer.

In the line 7, the generation unit 13 normalizes the convolutional feature quantity $h^k_v$. Then, in the line 9, the generation unit 13 generates a feature quantity obtained by aggregating the convolutional feature quantities $h^k_v$ of all nodes obtained by the specified K-layer convolution of the activity feature quantities by a specified aggregation method as an activity history feature quantity $z_v$ representing the feature of the activity history information. The generation unit 13 may generate the activity history feature quantity $z_v$ by calculating the sum of convolutional feature quantities by the K-layer convolution of all activities included in the activity history information.

Note that the generation unit 13 may perform the processing of the lines 4 and 5 in the algorithm shown in FIG. 6 by the following equation (1).

$$h_v^{(k)} = \text{ReLU}(W \cdot \text{MEAN}\{h_u^{(k-1)}, \forall u \in N(v) \cap \{v\}\})$$

ReLu in the equation (1) is one type of the activation function and, for example, it may be a function represented as:

$$\text{ReLU}(x) = \max(x, 0)$$

Further, MEAN in the equation (1) is a function that calculates the average value for each element.

Further, the generation unit 13 may perform the processing of the lines 4 and 5 in the algorithm shown in FIG. 6 by the following equation (2).

$$h_v^k = \text{Re}\, LU\left((1+\varepsilon^k) \cdot h_v^{k-1} + \sum_{u \in N(v)} h_u^{k-1}\right)$$

Figure 7:
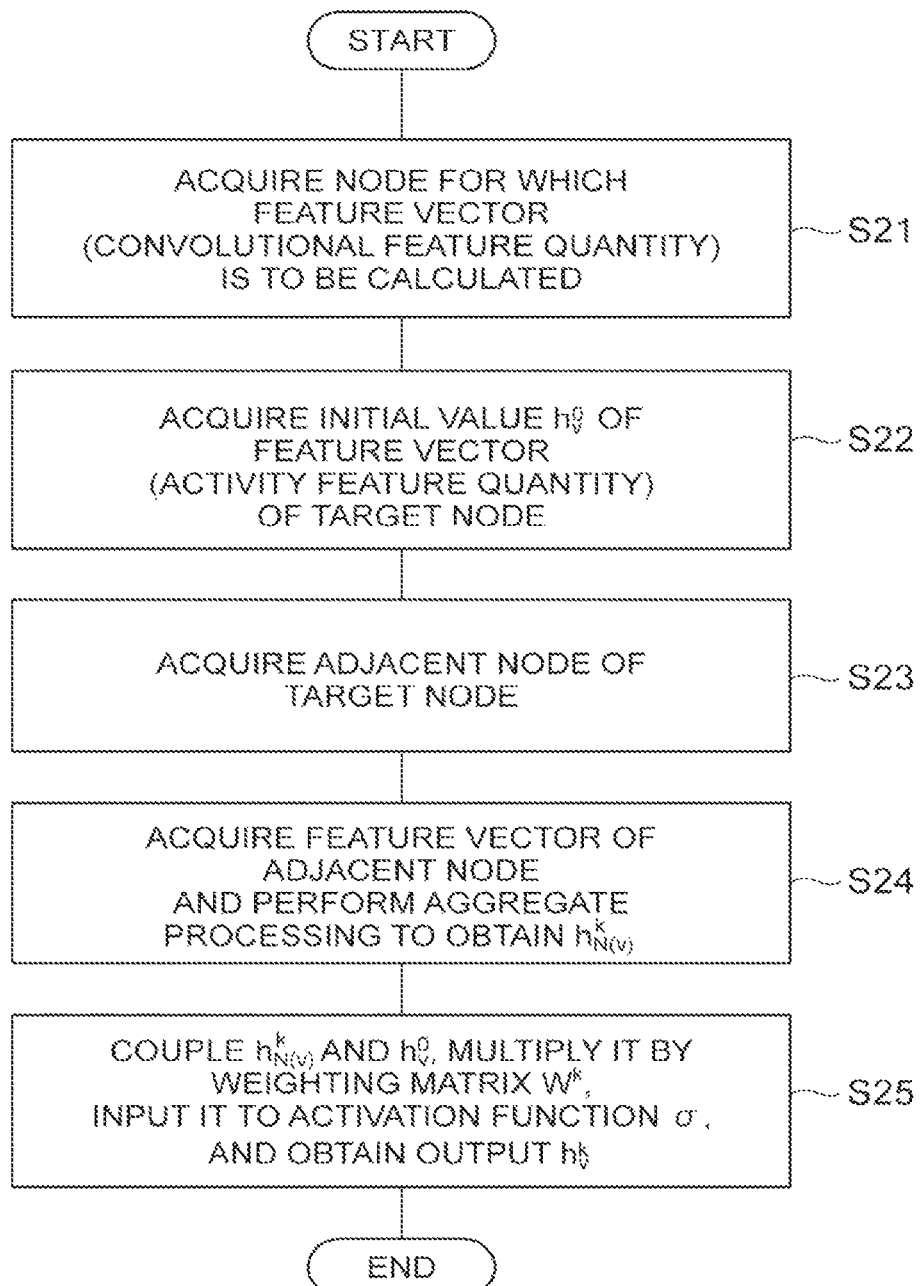
FIG. 7 is a view showing a flowchart of a generation process of the convolutional feature quantity.

FIG. 7 is a view showing a flowchart of a generation process of a convolutional feature quantity. In Step S21, the generation unit 13 acquires a node for which a feature vector (convolutional feature quantity) is to be calculated.

In Step S22, the generation unit 13 acquires an initial value $h^0_v$ of the feature vector (activity feature quantity) of a target node. In Step S23, the generation unit 13 acquires an adjacent node of the target node.

In Step S24, the generation unit 13 acquires a feature vector of the adjacent node and performs AGGREGATE processing, and thereby obtains a co-occurrence activity aggregate feature quantity $h^k_{N(v)}$.

In Step S25, the generation unit 13 couples the co-occurrence activity aggregate feature quantity $h^k_{N(v)}$ and the feature vector $h^k_{N(v)}$ of the target node, multiplies it by a weighting matrix $W^k$, inputs it to the activation function σ, and thereby obtains an output $h^k_v$.

By repeating the processing shown in this flowchart for all nodes, the convolution of activity feature quantities of one layer is implemented. Then, by repeating the processing of a specified K number of layers, the K-layer convolution of the activity feature quantities of all nodes is implemented.

Figure 8:
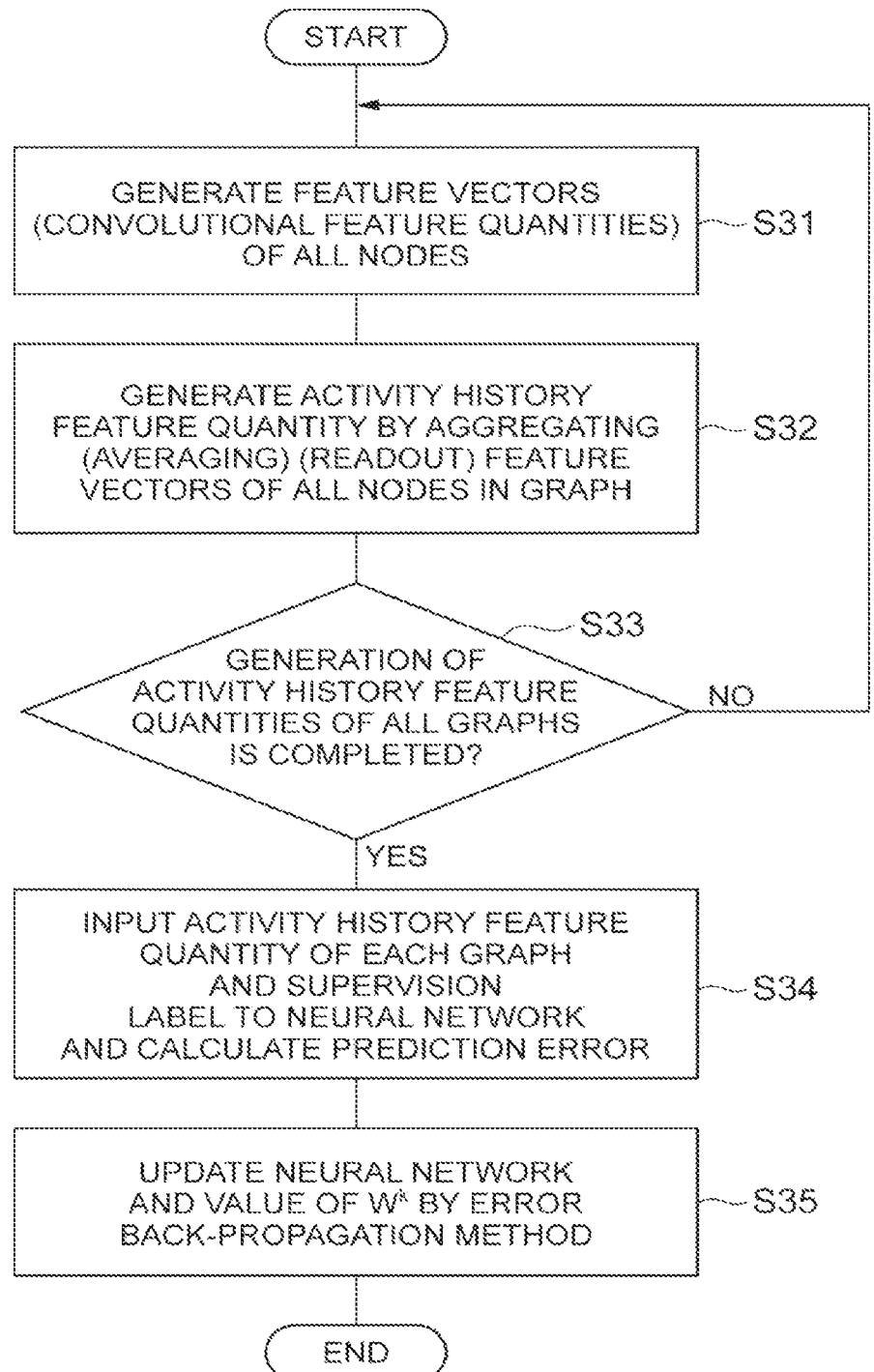
FIG. 8 is a flowchart showing a weighting matrix learning and generation process in the generation of the convolutional feature quantity.

A generation (learning) method of the weighting matrix $W^k$ in the line 5 of the algorithm shown in FIG. 6 is described hereinafter with reference to FIG. 8. FIG. 8 is a flowchart showing a weighting matrix learning and generation process in the generation of the convolutional feature quantity.

First, prior to the learning process, the acquisition unit 11 acquires a necessary number of activity history information, which is the basis for the learning data for the learning of the weighting matrix $W^k$, and the extraction unit 12 generates a graph where each activity is a node based on each of the activity history information as described with reference to FIGS. 3 and 4.

In Step S31, the generation unit 13 generates the feature vectors (convolutional feature quantities of a specified number of layers) of all nodes based on one graph among the generated graphs. In Step S32, the generation unit 13 generates the activity history feature quantity representing the feature of this graph by READOUT processing that aggregates feature vectors (for example, by the calculation of the average or the sum for each element) of all nodes in the graph.

In Step S33, the generation unit 13 determines whether the generation of the activity history feature quantities of all the graphs is completed or not. When it is determined that the generation of the activity history feature quantities of all the graphs is completed, the process proceeds to Step S34. When, on the other hand, it is not determined that the generation of the activity history feature quantities of all the graphs is completed, the processing of Steps S31 to S33 is repeated.

In Step S34, the generation unit 13 inputs the activity history feature quantity of each graph and the corresponding supervision label to a model including a neural network, and calculates a prediction error. The prediction error is calculated by the following equation (3):

$$-\frac{1}{n}\sum_{i=1}^{n}\sum_{j=1}^{m} y_{ij} \log(p_{ij})$$

In the above equation, n is the number of samples. m is the number of classification classes and, for example, m=2 when the model is to estimate high or low of user's stress. $y_{ij}$ is a supervision label for an i-th sample to belong to a class j, and $p_{ij}$ is the probability that the i-th sample calculated by the neural network belongs to the class j.

In Step S35, the generation unit 13 updates the neural network and the parameter value of $W^k$ by an error back-propagation method.

Specific examples of the generation of a graph (the extraction of co-occurrence relationship information) based on the activity history information, the generation of the convolutional feature quantity of each node (activity) (by one-layer convolution), and the generation of the activity history feature quantity are described hereinafter with reference to FIGS. 9 and 10.

Figure 9:
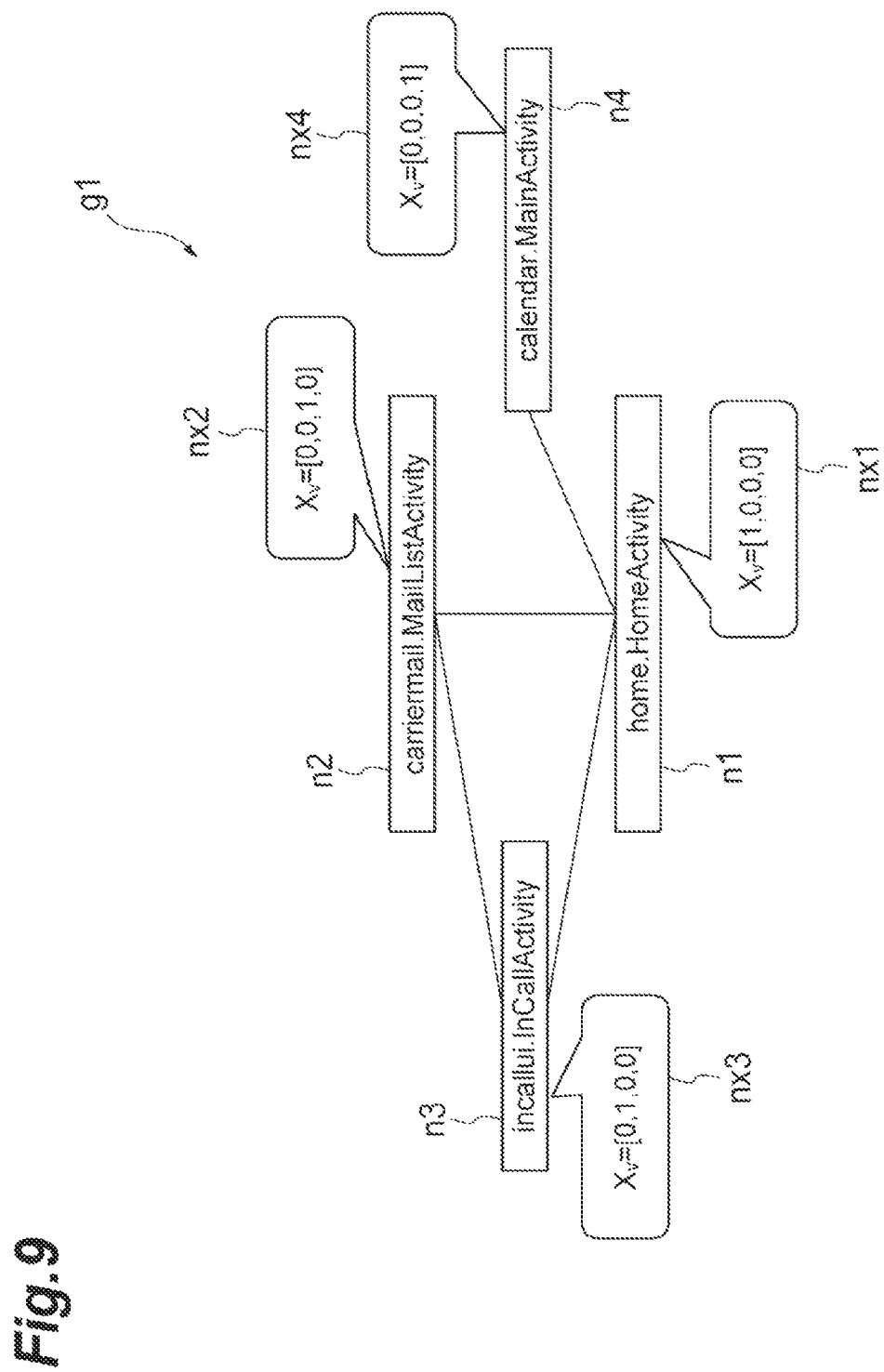
FIG. 9 is a view showing the activity feature quantity of each activity contained in a graph.

FIG. 9 is a view showing an example of the activity feature quantity of each activity contained in a graph. The graph g1 shown in FIG. 9 is the co-occurrence relationship information generated based on the activity history information by the extraction unit 12 as described with reference to FIG. 4. Nodes n1 to n4 included in the graph g1 are respectively associated with activity feature quantities nx1 to nx4, which are feature vectors representing the feature of each node.

The example of the activity feature quantities nx1 to nx4 shown in FIG. 9 is a four-dimensional vector indicating categories of activities, and each element is [customization, communication, tool, increase in work efficiency], and 1 is set to the relevant element.

The generation unit 13 generates the convolutional feature quantity of each node. An example of the generation of the convolutional feature quantity of the node n3 is described hereinafter. The generation unit 13 aggregates the activity feature quantities nx1 and nx2 of the nodes n1 and n2 adjacent to the node n3, and thereby generates a co-occurrence activity feature quantity. In this example, the generation unit 13 calculates the co-occurrence activity feature quantity $h^k_{N(v)}$ of the node n3 by the following equation (4), using the calculation of the average as the aggregate function AGGREGATE.

$$h^k_{N(v)}=([0,0,1,0]^t+[1,0,0,0]^t)/2=[0.5,0,0.5,0]^t$$

Then, the generation unit 13 combines the activity feature quantity of the node n3 and the co-occurrence activity feature quantity $h^k_{N(v)}$ by a specified combining function as represented by the following equation (5), and thereby calculates the convolutional feature quantity $h^k_v$ of the node n3.

$$h^k_v = \sigma\left(W\begin{bmatrix} 0 & 0.5 \\ 1 & 0 \\ 0 & 0.5 \\ 0 & 0 \end{bmatrix}\right)$$

In the equation (5), W is the weighting matrix described with reference to FIGS. 6 and 7. σ is a specified activation function.

Figure 10:
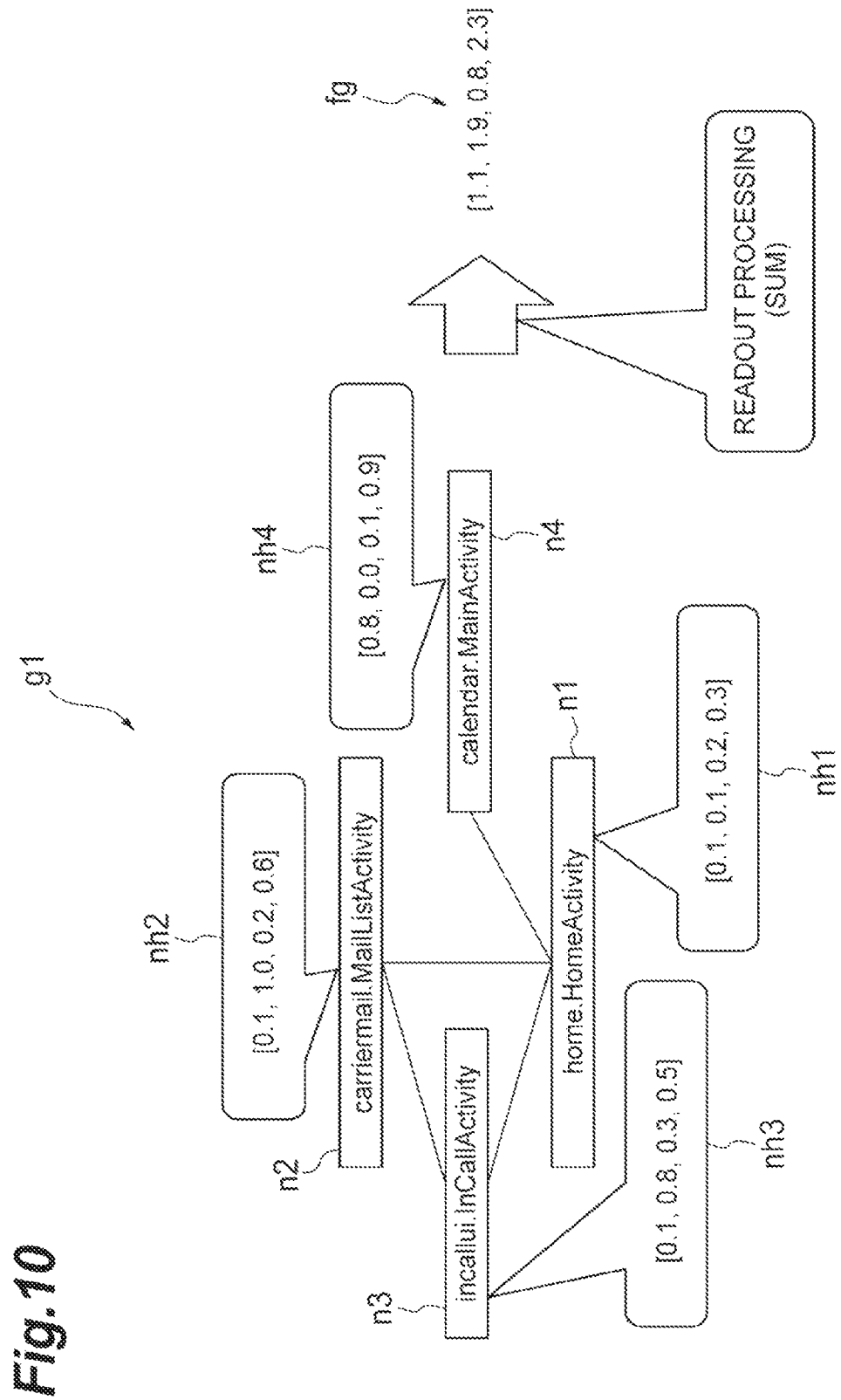
FIG. 10 is a view showing an example of the generation of a convolutional feature quantity of each activity and the generation of an activity history feature quantity.

FIG. 10 is a view showing an example of the generation of the convolutional feature quantity and the activity history feature quantity generated for each node (activity). As shown in FIG. 10, the generation unit 13 generates convolutional feature quantities nh1 to nh4 of the nodes n1 to n4, respectively, as described with reference to FIG. 9 and the equations (4) and (5).

After that, the generation unit 13 aggregates the convolutional feature quantities of all activities included in the activity history information and thereby generates the activity history feature quantity. In the specific example shown in FIG. 10, the generation unit 13 generates the activity history feature quantity fg by READOUT processing on the convolutional feature quantities nh1 to nh4 of all the nodes n1 to n4 included in the graph g1. In this example, the READOUT processing is the sum of all the convolutional feature quantities nh1 to nh4.

Note that the generation unit 13 may generate the convolutional feature quantity of the first activity by assigning weights to each co-occurrence relationship based on the frequency of appearance of a co-occurrence relationship between the first activity and the second activity in the activity history information and adding the weights to each of the activity feature quantities of the second activity.

For example, although the co-occurrence activity feature quantity of the node n3 is generated by calculating the average of the activity feature quantities nx1 and nx2 in the example of the generation of the convolutional feature quantity of the node n3 described with reference to FIG. 9, the weighted average obtained by adding weights according to the frequency of appearance of a co-occurrence relationship between the node n3 and the node n1 and the frequency of appearance of a co-occurrence relationship between the node n3 and the node n2 to each of the activity feature quantities nx1 and nx2 may be generated as the co-occurrence activity feature quantity of the node n3. Assigning weights in this manner allows the level of a co-occurrence relationship with the activity of the adjacent node to be reflected on the convolutional feature quantity of each activity.

Further, the generation unit 13 may assign weights to each co-occurrence relationship based on the frequency of appearance of a co-occurrence relationship between the first activity and the second activity in the activity history information, and generate the convolutional feature quantity of the first activity based on the activity feature quantity of one or more second activities extracted based on the weights.

For example, in the example of the graph g1 shown in FIG. 9, in the generation of the convolutional feature quantity of the node n1, the activity feature quantities of all the nodes n2 to n4 having a co-occurrence relationship with the node n1 are aggregated in the case where no consideration is given to weighting. On the other hand, in the case where consideration is given to weighting on each co-occurrence relationship based on the frequency of appearance of a co-occurrence relationship, the generation unit 13 may perform the generation of the convolutional feature quantity by aggregating only the activity feature quantities of nodes having a co-occurrence relationship weighted by a predetermined value or more among the nodes n2 to n4. In this manner, by extracting the activity feature quantities to be aggregated in the generation of the convolutional feature quantity based on weights assigned to a co-occurrence relationship, the feature of the second activity having a weak co-occurrence relationship that occurs incidentally, for example, is not reflected on the convolutional feature quantity.

Referring back to FIG. 1, the output unit 14 outputs the activity history feature quantity generated by the generation unit 13 as a feature quantity to be input to the state estimation model. To be specific, the output unit 14 may store the activity history feature quantity into the activity history feature quantity storage unit 30. The activity history feature quantity storage unit 30 is a storage means that stores the activity history feature quantity.

Figure 11:
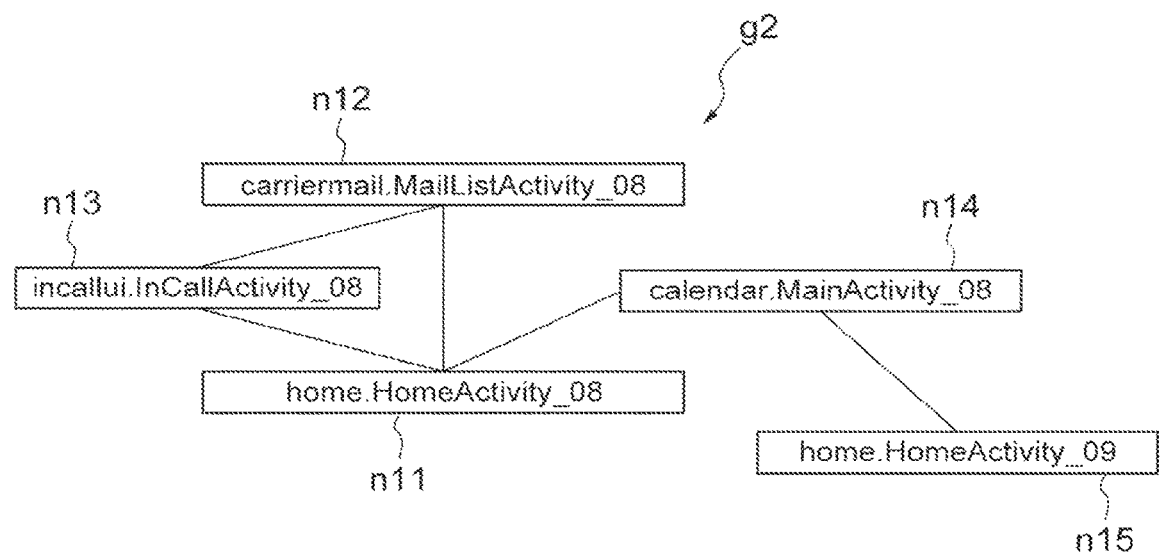
FIG. 11($a$) is a view showing an example of activity history information where each activity log includes information about time, and FIG. 11($b$) is a view showing an example of the generation of a graph based on an activity log that includes time as a context.
Figure 12:
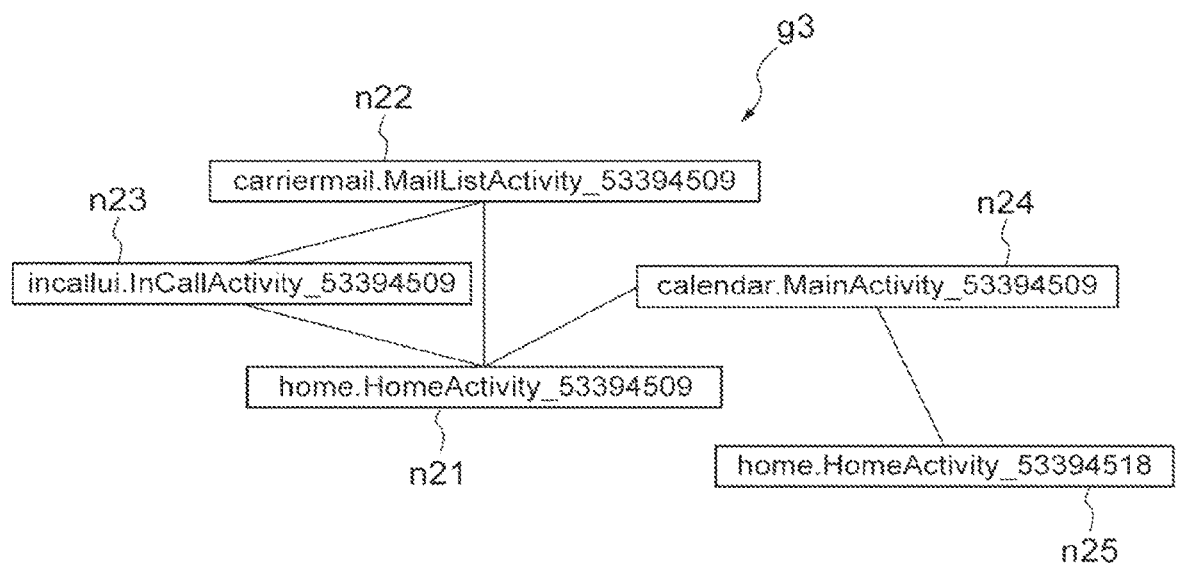
FIG. 12($a$) is a view showing an example of activity history information where each activity log includes information about a position, and FIG. 12($b$) is a view showing an example of the generation of a graph based on an activity log that includes a position as a context.

Another example of the generation of a graph as the co-occurrence relationship information is described hereinafter with reference to FIGS. 11 and 12. When an activity log contains a context such as time and position information, the extraction unit 12 may extract the co-occurrence relationship information by uniquely identifying the activity logs where the activity is the same and the context is different.

FIG. 11(a) is a view showing an example of the activity history information where each activity log contains information about time. FIG. 11(b) is a view showing an example of the generation of a graph based on an activity log that contains time as a context. As shown in FIG. 11(a), when each activity log in the activity history information contains information about time as a context, the extraction unit 12 generates the graph g2 shown in FIG. 11(b) as the co-occurrence relationship information. To be specific, because an activity contained in each activity log is associated with information about time, the extraction unit 12 can make each node contain information indicating time such as "_08" and "_09". Thus, since time information associated with the same type of activity "home.HomeActivity" is different ("8:15" and "9:00"), the extraction unit 12 uniquely identifies those activity logs and generates the graph g2 including two different nodes n11 "home.HomeActivity_08" and n15 "home.HomeActivity_09" as the co-occurrence relationship information.

FIG. 12(a) is a view showing an example of the activity history information where each activity log contains information about a position. FIG. 12(b) is a view showing an example of the generation of a graph based on an activity log that contains a position as a context. As shown in FIG. 12(a), when each activity log in the activity history information contains information for identifying a position such as a mesh code as a context, the extraction unit 12 generates the graph g3 shown in FIG. 12(b) as the co-occurrence relationship information. To be specific, because an activity contained in each activity log is associated with a mesh code for identifying a position, the extraction unit 12 can make each node contain information indicating a position such as "_53394509" and "_53394518". Thus, since information about a position (mesh code) associated with the same type of activity "home.HomeActivity" is different ("_53394509" and "_53394518"), the extraction unit 12 uniquely identifies those activity logs and generates the graph g3 including two different nodes n11 "home.HomeActivity_53394509" and n15 "home.HomeActivity_53394518" as the co-occurrence relationship information.

As described above, the co-occurrence relationship information is generated by uniquely identifying activities with different contexts, and therefore the activity history feature quantity on which a user's state is reflected more specifically is generated.

Referring back to FIG. 1, the estimation unit 15 inputs the activity history feature quantity generated by the generation unit 13 to the state estimation model, and estimates a state related to a terminal or a user of this terminal. To be specific, the estimation unit 15 inputs the activity history feature quantity stored in the activity history feature quantity storage unit 30 to the state estimation model, and acquires an output from this model as information indicating a state related to a terminal or a user of this terminal.

The state estimation model is a model including a neural network that is built by machine learning based on learning data where the activity history feature quantity is the input feature quantity and identification information for identifying a state related to a terminal or a user of this terminal as the supervision label.

The state estimation model, which is a model including a learned neural network, can be regarded as a program that is read or referred to by a computer, and causes the computer to perform specified processing and causes the computer to implement specified functions.

Specifically, the learned state estimation model according to this embodiment is used in a computer including a CPU and a memory. To be specific, the CPU of the computer operates to perform computation based on a learned weighting coefficient, response function or the like corresponding to each layer on input data (activity history feature quantity)

that is input to an input layer of the neural network according to an instruction from the learned state estimation model stored in the memory, and output a result (the likelihood of each state label) from an output layer.

The neural network included in the state estimation model may be a feedforward neural network, a convolutional neural network or the like, for example, and the type of a neural network to be used is not limited.

The state estimation system 1 may build the state transition model by performing machine learning based on the activity history feature quantity generated and output by the feature extraction device 10 and supervision data composed of preset supervision labels.

The state output unit 16 outputs state information indicating a state related to a terminal or a user of this terminal estimated by the estimation unit 15. To be specific, the state output unit 16 stores the state information into a specified storage means or displays the state information on a specified display device.

Figure 13:
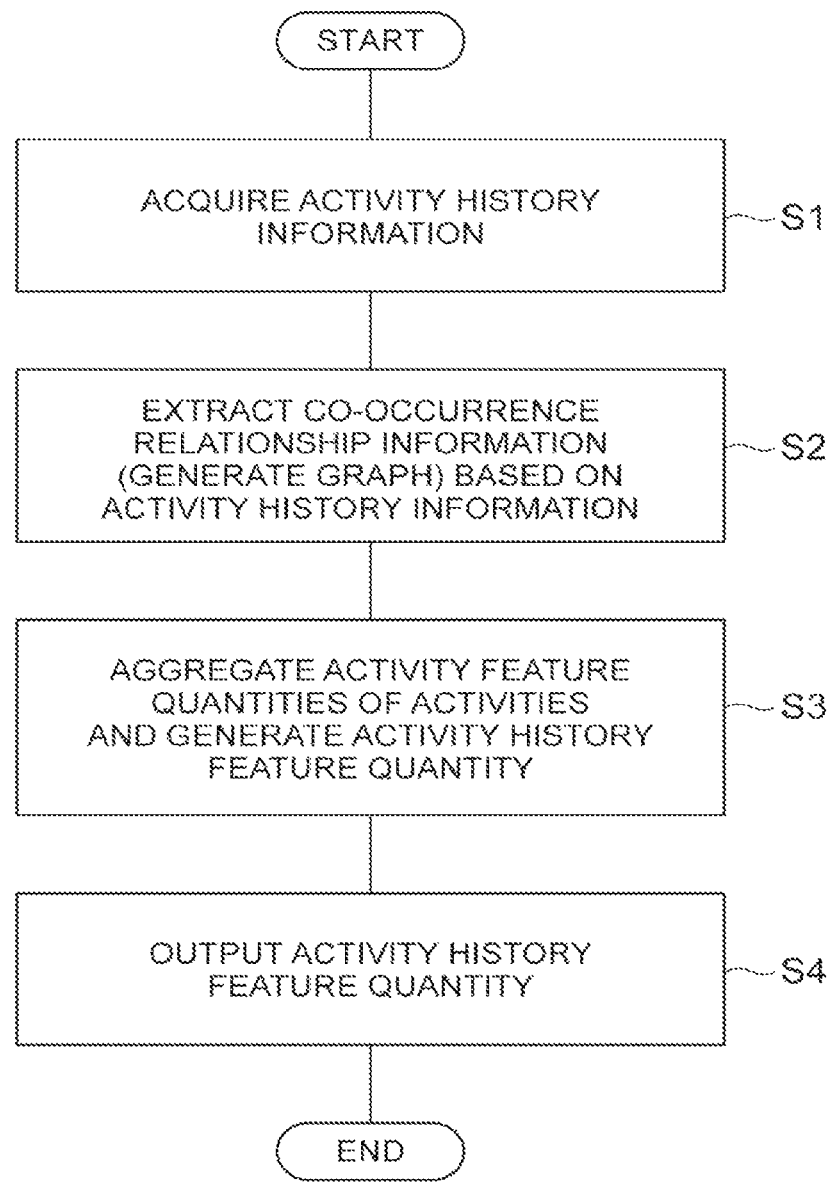
FIG. 13 is a flowchart showing a process of a feature extraction method in the feature extraction device.

FIG. 13 is a flowchart showing a process of a feature extraction method in the feature extraction device 10.

In Step S1, the acquisition unit 11 acquires activity history information indicating an execution history of activities for a specified period of time. Next, in Step S2, the extraction unit 12 extracts co-occurrence relationship information indicating a co-occurrence relationship between activities in a specified period of time based on the activity history information. In this embodiment, the extraction unit 12 generates, as the co-occurrence relationship information, a graph that represents activities as nodes and a co-occurrence relationship between activities as an edge that connects nodes of the activities.

In Step S3, the generation unit 13 aggregates activity feature quantities representing the features of activities based on the co-occurrence relationship information, and thereby generates an activity history feature quantity representing the feature of the activity history information. In this embodiment, since the activity history information is represented by a graph where activities are nodes, the generation unit 13 aggregates the activity feature quantities associated with the respective nodes based on co-occurrence relationship information represented by the graph.

In Step S4, the output unit 14 outputs the activity history feature quantity generated by the generation unit 13 as a feature quantity to be input to the state estimation model.

Figure 14:
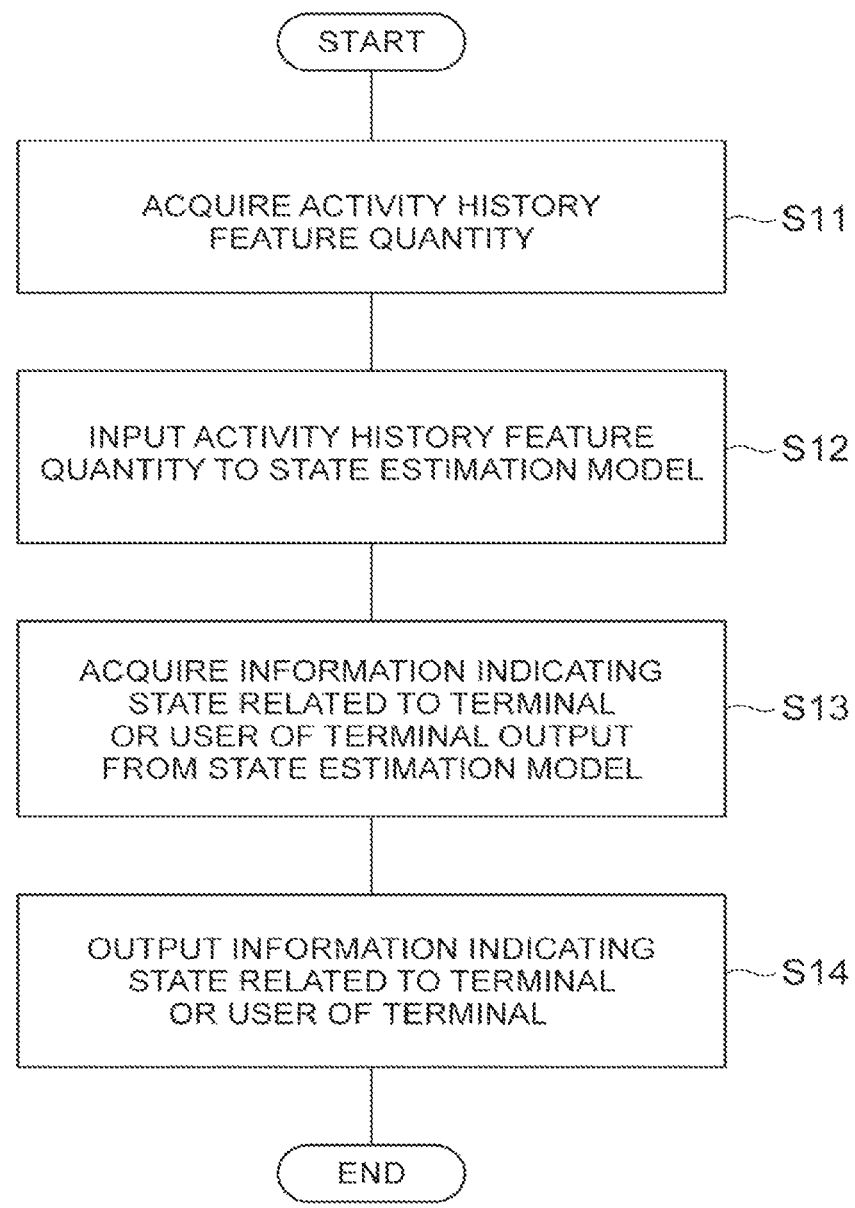
FIG. 14 is a flowchart showing a process of a state estimation method in the state estimation system.

FIG. 14 is a flowchart showing a process of a state estimation method in the state estimation system 1. In Step S11, the estimation unit 15 acquires the activity history feature quantity stored in the activity history feature quantity storage unit 30.

In Step S12, the estimation unit 15 inputs the activity history feature quantity to the state estimation model.

In Step S13, the estimation unit 15 acquires an output from the state estimation model as state information indicating a state related to a terminal or a user of this terminal.

In Step S14, the state output unit 16 outputs the state information acquired in Step S13. To be specific, the state output unit 16 stores the state information into a specified storage means or displays the state information on a specified display device.

Figure 15:
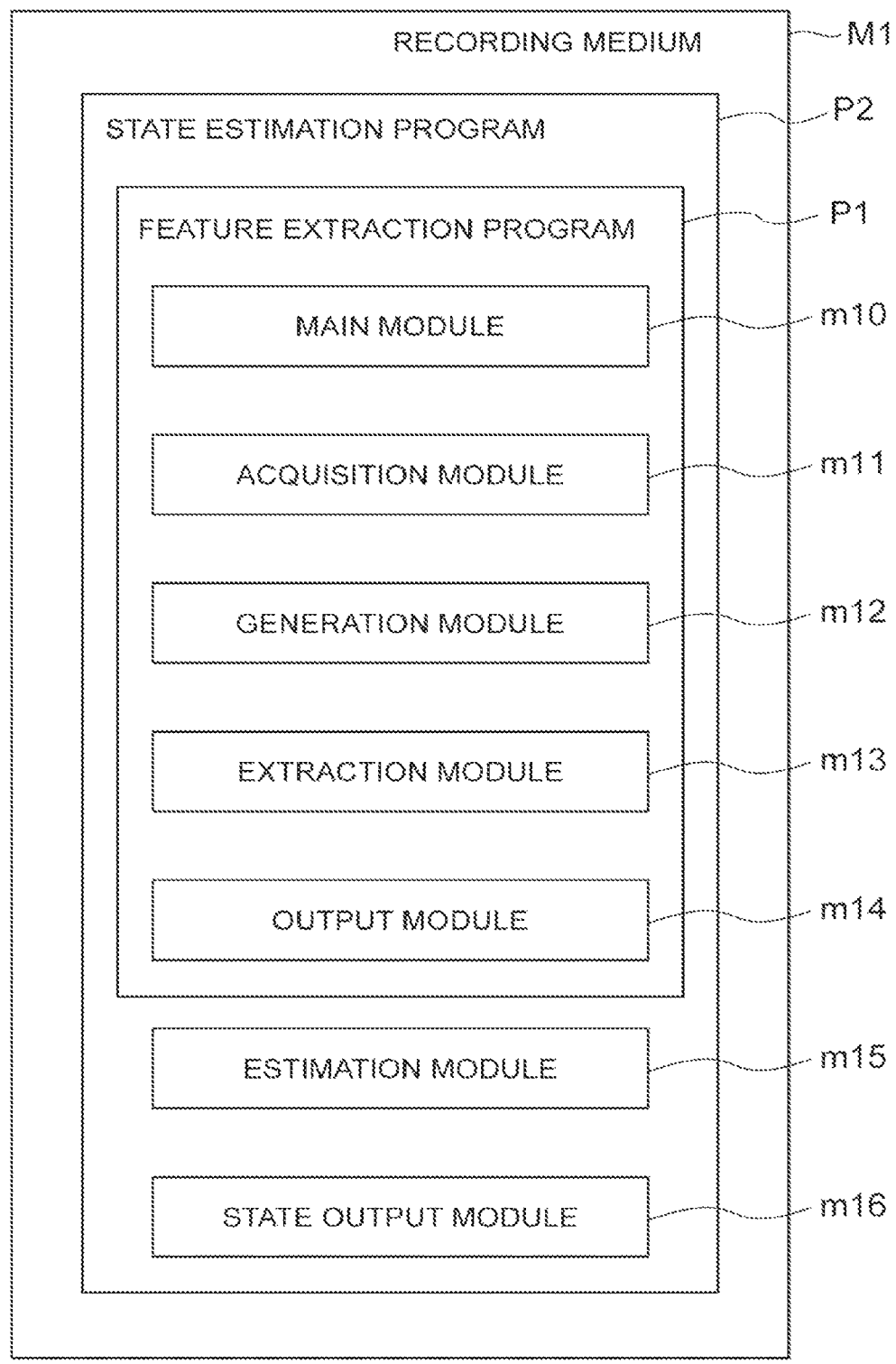
FIG. 15 is a view showing the structure of a feature extraction program and a state estimation program.

A feature extraction program that causes a computer to function as the feature extraction device 10 according to this embodiment and a state estimation program that causes the computer to function as the state estimation system 1 are described hereinafter. FIG. 15 is a view showing the structure of the feature extraction program and the state estimation program.

A feature extraction program P1 includes a main module m10 that exercises control over the feature extraction processing in the feature extraction device 10, an acquisition module m11, an extraction module m12, a generation module m13, and an output module m14. The functions for the acquisition unit 11, the extraction unit 12, the generation unit 13, and the output unit 14 are implemented by the modules m11 to m14, respectively.

A state estimation program P2 includes an estimation module m15 and a state output module m16, in addition to the modules that cause a computer to function as the feature extraction device 10. The functions for the estimation unit 15 and the state output unit 16 are implemented by the estimation module m15 and the state output module m16, respectively.

Note that the feature extraction program P1 and the state estimation program P2 may be transmitted through a transmission medium such as a communication line or may be stored in a recording medium M1 as shown in FIG. 15.

In the feature extraction device 10, the feature extraction method, and the feature extraction program P1 according to the embodiment described above, co-occurrence relationship information indicating a co-occurrence relationship of activities executed in a specified period of time is extracted based on activity history information. Since an activity is executed in a user's terminal, a state of a terminal or a user of the terminal is reflected on the co-occurrence relationship information. Then, activity feature quantities of activities contained in the activity history information are aggregated based on the co-occurrence relationship information, and thereby an activity history feature quantity where a user's state is accurately reflected and also the user's state is closely represented is generated. Thus, the estimation accuracy of a user's state is improved by using the activity history feature quantity generated in this manner as a feature quantity to be input to the state estimation model.

In the feature extraction device according to another embodiment, the co-occurrence relationship information may include associating information for associating a plurality of activities executed in a specified period of time with one another.

According to the above embodiment, activities that are executed temporarily close to each other are associated and included in the co-occurrence relationship information. Thus, the tendency of execution of activities is appropriately reflected on the co-occurrence relationship information.

In the feature extraction device according to another embodiment, the co-occurrence relationship information may include transition information indicating a transition relationship of activities executed consecutively in a specified period of time.

According to the above embodiment, two activities executed consecutively are associated as the transition information and included in the co-occurrence relationship information. Thus, a transition relationship of execution of activities is appropriately reflected on the co-occurrence relationship information.

In the feature extraction device according to another embodiment, each of the activity logs included in the activity history information may include an event flag indicating an execution state of the activity, and the extraction unit may extract the co-occurrence relationship information based on an activity log with which a specified event flag is associated.

According to the above embodiment, only the activity logs on which a user's state is appropriately reflected are used for the extraction of the co-occurrence relationship.

In the feature extraction device according to another embodiment, the generation unit may generate a feature quantity that aggregates the activity feature quantity of one activity and an activity feature quantity of one or more activities having the co-occurrence relationship with the one activity by a specified convolution method as a convolutional feature quantity of the one activity, and generate a feature quantity that aggregates convolutional feature quantities of all activities included in the activity history information by a specified aggregation method as the activity history feature quantity.

According to the above embodiment, the convolutional feature quantity on which the feature of an activity having the co-occurrence relationship with one activity is reflected is generated for each activity, and the convolutional feature quantities of all activities are aggregated, and thereby the activity history feature quantity is generated. The feature quantity where a state of a terminal or a user of the terminal is closely represented is thereby obtained.

In the feature extraction device according to another embodiment, the generation unit may perform hierarchical convolution of activity feature quantities in a specified number of layers from a first layer to a k-th layer (k is a predetermined integer of 1 or more) based on the co-occurrence relationship information, when each activity of a plurality of activities having a co-occurrence relationship as indicated by the co-occurrence relationship information is a first activity in an n-th layer (n is an integer of 0 or more), the generation unit may define one or more activities having a co-occurrence relationship with the first activity as a second activity, in convolution of the first layer, the generation unit may generate the convolutional feature quantity of the first activity in the first layer by convolving an activity feature quantity of the first activity in a 0th layer and an activity feature quantity of one or more second activities having the co-occurrence relationship with the first activity by a specified convolution method, in convolution of an m-th layer (in is an integer of 2 or more), the generation unit may generate the convolutional feature quantity of the first activity in the m-th layer by convolving an activity feature quantity of the first activity in an (m−1)th layer and the activity feature quantity of the one or more second activities having the co-occurrence relationship with the first activity by a specified convolution method, the generation unit may generate the convolutional feature quantity of the first activity in the k-th layer in convolution of the k-th layer as the convolutional feature quantity of the one activity based on k-layer convolution, and the generation unit may generate a feature quantity that aggregates the convolutional feature quantities based on the k-layer convolution of all activities included in the activity history information by a specified aggregation method as the activity history feature quantity.

According to the above embodiment, the range of other activities having a co-occurrence relationship to be convolved into the convolutional feature quantity of one activity can be adjusted by appropriately setting the number of layers of convolution. This enables the generation of the convolutional feature quantity where the co-occurrence relationship of activities is reflected at an appropriate level.

In the feature extraction device according to another embodiment, the generation unit may generate a co-occurrence activity aggregate feature quantity by aggregating the activity feature quantity of one or more second activities having the co-occurrence relationship with the first activity by a specified aggregation method, and generate the convolutional feature quantity of the first activity by combining the co-occurrence activity aggregate feature quantity and an activity feature quantity of the first activity.

According to the above embodiment, the co-occurrence activity aggregate feature quantity that aggregates the activity feature quantities of the second activity having the co-occurrence relationship with the first activity is generated, and the convolutional feature quantity is generated by combining the co-occurrence activity aggregate feature quantity and the activity feature quantity of the first activity, and therefore the convolutional feature quantity where the activity feature quantity of the first activity is mainly reflected and further the activity feature quantity of the second activity is appropriately reflected is obtained.

In the feature extraction device according to another embodiment, the generation unit may generate the co-occurrence activity aggregate feature quantity by aggregation using calculation of an average or a sum of activity feature quantities of one or more second activities and acquisition of a greatest value.

The above embodiment allows the activity feature quantity of the second activity to be appropriately reflected on the co-occurrence activity aggregate feature quantity.

In the feature extraction device according to another embodiment, the generation unit may assign weights to each co-occurrence relationship based on a frequency of appearance of the co-occurrence relationship between the first activity and the second activity in the activity history information, and generate the convolutional feature quantity of the first activity by adding the weights to the activity feature quantity of each second activity.

The above embodiment allows the strength of the co-occurrence relationship of each of the second activities with the first activity to be reflected on the convolutional feature quantity.

In the feature extraction device according to another embodiment, the generation unit may assign weights to each co-occurrence relationship based on a frequency of appearance of the co-occurrence relationship between the first activity and the second activity in the activity history information, and generate the convolutional feature quantity of the first activity based on the activity feature quantity of one or more second activities extracted based on the weights from the one or more second activities.

The above embodiment enables preventing the feature of the second activity having a weak co-occurrence relationship such as occurring incidentally from being reflected on the convolutional feature quantity.

In the feature extraction device according to another embodiment, the generation unit may generate the activity history feature quantity by calculating a sum of the convolutional feature quantities of all activities included in the activity history information.

The above embodiment allows the features of all activities included in the activity history information to be appropriately reflected on the activity history feature quantity.

In the feature extraction device according to another embodiment, the activity log may include a context of at least one of time and position information, and the extraction unit may extract the co-occurrence relationship information by uniquely identifying activity logs where an activity is the same and the context is different.

According to the above embodiment, activities with different contexts are uniquely identified, and therefore the activity history feature quantity on which a user's state is reflected more specifically is generated.

A state estimation system according to one embodiment of the present invention is a state estimation system for estimating a state related to a terminal where an activity is executed or a user of the terminal, the system including an acquisition unit configured to acquire activity history information indicating an execution history of the activity in a specified period of time and including time-series activity logs, an extraction unit configured to extract co-occurrence relationship information indicating a co-occurrence relationship of activities in a specified period of time based on the activity history information, a generation unit configured to aggregate activity feature quantities indicating a feature of each activity based on the co-occurrence relationship information, and generate an activity history feature quantity indicating a feature of the activity history information, an estimation unit configured to estimate a state related to the terminal or a user of the terminal by inputting the activity history feature quantity generated by the generation unit to a state estimation model including a neural network built by machine learning based on learning data where the activity history feature quantity is an input feature quantity and identification information for identifying a state related to the terminal or a user of the terminal as a supervision label, and a state output unit configured to output state information indicating a state related to a terminal or a user of the terminal estimated by the estimation unit.

According to the above embodiment, the co-occurrence relationship information which indicates the co-occurrence relationship of activities executed in a specified period of time based on the activity history information indicating an execution history of activities executed in a user's terminal and on which a state of a terminal or a user of the terminal is reflected is extracted. Then, the activity feature quantities of activities included in the activity history information are aggregated based on the co-occurrence relationship information, and thereby the activity history feature quantity where a user's state is accurately reflected and also the user's state is closely represented is generated. By inputting the activity history feature quantity generated in this manner to the state estimation model, the user's state is accurately estimated.

Although the present embodiment is described in detail above, it is apparent to those skilled in the art that the present embodiment is not restricted to the embodiment described in this specification. The present embodiment can be implemented as a modified and changed form without deviating from the spirit and scope of the present invention defined by the appended claims. Accordingly, the description of the present specification is given merely by way of illustration and does not have any restrictive meaning to the present embodiment.

Further, each aspect/embodiment described in the present specification may be applied to LTE (Long Term Evolution), LTE-A (LTE Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra Wide Band), Bluetooth (registered trademark), a system using another appropriate system and/or a next generation system extended based on these systems.

The procedure, the sequence, the flowchart and the like in each aspect/embodiment described in this specification may be in a different order unless inconsistency arises. For example, for the method described in this specification, elements of various steps are described in an exemplified order, and it is not limited to the specific order described above.

Input/output information or the like may be stored in a specific location (e.g., memory) or managed in a management table. Further, input/output information or the like can be overwritten or updated, or additional data can be written. Output information or the like may be deleted. Input information or the like may be deleted. Input information or the like may be transmitted to another device.

The determination may be made by a value represented by one bit (0 or 1), by a truth-value (Boolean: true or false), or by numerical comparison (e.g., comparison with a specified value).

Each aspect/embodiment described in the present specification may be used alone, may be used in combination, or may be used by being switched according to the execution. Further, a notification of specified information (e.g., a notification of "being X") is not limited to be made explicitly, and it may be made implicitly (e.g., a notification of the specified information is not made).

Although the present disclosure is described in detail above, it is apparent to those skilled in the art that the present disclosure is not restricted to the embodiment described in this disclosure. The present disclosure can be implemented as a modified and changed form without deviating from the spirit and scope of the present disclosure defined by the appended claims. Accordingly, the description of the present disclosure is given merely by way of illustration and does not have any restrictive meaning to the present disclosure, Software may be called any of software, firmware, middleware, microcode, hardware description language or another name, and it should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions and the like may be transmitted and received via a transmission medium. For example, when software is transmitted from a website, a server or another remote source using wired technology such as a coaxial cable, an optical fiber cable, a twisted pair and a digital subscriber line (DSL) and/or wireless technology such as infrared rays, radio and microwaves, those wired technology and/or wireless technology are included in the definition of the transmission medium.

The information, signals and the like described in the present disclosure may be represented by any of various different technologies. For example, data, an instruction, a command, information, a signal, a bit, a symbol, a chip and the like that can be referred to in the above description may be represented by a voltage, a current, an electromagnetic wave, a magnetic field or a magnetic particle, an optical field or a photon, or an arbitrary combination of them.

Note that the term described in the present disclosure and/or the term needed to understand the present specification may be replaced by a term having the same or similar meaning.

The terms "system" and "network" used in the present specification are used to be compatible with each other.

Further, information, parameters and the like described in the present specification may be represented by an absolute value, a relative value to a specified value, or corresponding different information.

Note that the term "determining" and "determining" used in the present disclosure includes a variety of operations. For example, "determining" and "determining" can include regarding the act of judging, calculating, computing, processing, deriving, investigating, looking up/searching/inquiring (e.g., looking up in a table, a database or another data structure), ascertaining or the like as being "determined" and "determined". Further, "determining" and "determining" can include regarding the act of receiving (e.g., receiving information), transmitting (e.g., transmitting information), inputting, outputting, accessing (e.g., accessing data in a memory) or the like as being "determined" and "determined". Further, "detennining" and "determining" can include regarding the act of resolving, selecting, choosing, establishing, comparing or the like as being "determined" and "determined". In other words, "determining" and "determining" can include regarding a certain operation as being "determined" and "determined". Further, "determining (determining)" may be replaced with "assuming", "expecting", "considering" and the like.

The description "based on" used in the present disclosure does not mean "based only on" unless otherwise noted. In other words, the description "based on" means both of "based only on" and "based at least on".

When the terms such as "first" and "second" are used in this specification, any reference to the element does not limit the amount or order of the elements in general. Those terms can be used in this specification as a convenient way to distinguish between two or more elements. Thus, reference to the first and second elements does not mean that only two elements can be adopted or the first element needs to precede the second element in a certain form.

As long as "include", "including" and transformation of them are used in the present specification or claims, those terms are intended to be comprehensive like the term "comprising". Further, the term "or" used in the present specification or claims is intended not to be exclusive OR.

In this specification, reference to a device includes both one and more than one of such devices unless it is obviously singular contextually or technically.

In the entire present disclosure, the singular includes the plural except where otherwise clearly indicated by context.

REFERENCE SIGNS LIST

1 . . . state estimation system, 10 . . . feature extraction device, 11 . . . acquisition unit, 12 . . . extraction unit, 13 . . . generation unit, 14 . . . output unit, 15 . . . estimation unit, 16 . . . state output unit, 20 . . . activity history information storage unit, 30 . . . activity history feature quantity storage unit, M1 . . . recording medium, m10 . . . main module, m11 . . . acquisition module, m12 . . . extraction module, m13 . . . generation module, m14 . . . output module, m15 . . . estimation module, m16 . . . state output module, P1 . . . feature extraction program, P2 . . . state estimation program

The invention claimed is:

1. A feature extraction device for extracting a feature quantity indicating a feature related to an execution history of an activity based on the execution history, the feature quantity being input to a state estimation model for estimating a state related to a terminal where the activity is executed, or a user of the terminal, the feature extraction device comprising circuitry configured to:
acquire activity history information indicating an execution history of the activity in a specified period of time and including time-series activity logs;
extract co-occurrence relationship information indicating a co-occurrence relationship of activities in a specified period of time based on the activity history information;
aggregate activity feature quantities indicating a feature of each activity based on the co-occurrence relationship information, and generate an activity history feature quantity indicating a feature of the activity history information; and
output the activity history feature quantity as a feature quantity to be input to the state estimation model,
wherein the circuitry generates a feature quantity that aggregates the activity feature quantity of one activity and an activity feature quantity of one or more activities having the co-occurrence relationship with the one activity by a specified convolution method as a convolutional feature quantity of the one activity, and generates a feature quantity that aggregates convolutional feature quantities of all activities included in the activity history information by a specified aggregation method as the activity history feature quantity,
wherein
the circuitry performs is hierarchical convolution of activity feature quantities in a specified number of layers from a first layer to a k-th layer (k is a predetermined integer of 1 or more) based on the co-occurrence relationship information,
when each activity of a plurality of activities having a co-occurrence relationship as indicated by the co-occurrence relationship information is a first activity in an n-th layer (n is an integer of 0 or more), the circuitry defines one or more activities having a co-occurrence relationship with the first activity as a second activity,
in convolution of the first layer, the circuitry generates the convolutional feature quantity of the first activity in the first layer by convolving an activity feature quantity of the first activity in a 0th layer and an activity feature quantity of one or more second activities having the co-occurrence relationship with the first activity by a specified convolution method,
in convolution of an m-th layer (m is an integer of 2 or more), the circuitry generates the convolutional feature quantity of the first activity in the m-th layer by convolving an activity feature quantity of the first activity in an (m−1)th layer and the activity feature quantities of the one or more second activities having the co-occurrence relationship with the first activity by a specified convolution method,
the circuitry generates the convolutional feature quantity of the first activity in the k-th layer in convolution of the k-th layer as the convolutional feature quantity of the one activity based on k-layer convolution, and
the circuitry generates a feature quantity that aggregates the convolutional feature quantities based on the k-layer convolution of all activities included in the activity history information by a specified aggregation method as the activity history feature quantity.

2. The feature extraction device according to claim 1, wherein the co-occurrence relationship information includes associating information for associating a plurality of activities executed in a specified period of time with one another.

3. The feature extraction device according to claim 1, wherein
each of the activity logs included in the activity history information includes an event flag indicating an execution state of the activity, and
the circuitry extracts the co-occurrence relationship information based on an activity log with which a specified event flag is associated.

4. The feature extraction device according to claim 1, wherein
the circuitry generates a co-occurrence activity aggregate feature quantity by aggregating the activity feature quantity of one or more second activities having the co-occurrence relationship with the first activity by a specified aggregation method, and
the circuitry generates the convolutional feature quantity of the first activity by combining the co-occurrence activity aggregate feature quantity and an activity feature quantity of the first activity.

5. The feature extraction device according to claim 1, wherein the circuitry assigns weights to each co-occurrence relationship based on a frequency of appearance of the co-occurrence relationship between the first activity and the second activity in the activity history information, and generates the convolutional feature quantity of the first activity by adding the weights to the activity feature quantity of each of the second activity.

6. The feature extraction device according to claim 1, wherein the circuitry assigns weights to each co-occurrence relationship based on a frequency of appearance of the co-occurrence relationship between the first activity and the second activity in the activity history information, and generates the convolutional feature quantity of the first activity based on the activity feature quantity of one or more second activities extracted based on the weights from the one or more second activities.

7. The feature extraction device according to claim 1, wherein
the activity log includes a context of at least one of time and position information, and
the circuitry extracts the co-occurrence relationship information by uniquely identifying activity logs where an activity is the same and the context is different.

8. A state estimation system for estimating a state related to a terminal where an activity is executed or a user of the terminal, comprising circuitry configured to:
acquire activity history information indicating an execution history of the activity in a specified period of time and including time-series activity logs;
extract co-occurrence relationship information indicating a co-occurrence relationship of activities in a specified period of time based on the activity history information;
aggregate activity feature quantities indicating a feature of each activity based on the co-occurrence relationship information, and generate an activity history feature quantity indicating a feature of the activity history information;
estimate a state related to the terminal or a user of the terminal by inputting the activity history feature quantity generated by the circuitry to a state estimation model including a neural network built by machine learning based on learning data where the activity history feature quantity is an input feature quantity and identification information for identifying a state related to the terminal or a user of the terminal as a supervision label; and
output state information indicating a state related to a terminal or a user of the terminal estimated by the circuitry,
wherein the circuitry generates a feature quantity that aggregates the activity feature quantity of one activity and an activity feature quantity of one or more activities having the co-occurrence relationship with the one activity by a specified convolution method as a convolutional feature quantity of the one activity, and generates a feature quantity that aggregates convolutional feature quantities of all activities included in the activity history information by a specified aggregation method as the activity history feature quantity,
wherein
the circuitry performs hierarchical convolution of activity feature quantities in a specified number of layers from a first layer to a k-th layer (k is a predetermined integer of 1 or more) based on the co-occurrence relationship information,
when each activity of a plurality of activities having a co-occurrence relationship as indicated by the co-occurrence relationship information is a first activity in an n-th layer (n is an integer of 0 or more), the circuitry defines one or more activities having a co-occurrence relationship with the first activity as a second activity,
in convolution of the first layer, the circuitry generates the convolutional feature quantity of the first activity in the first layer by convolving an activity feature quantity of the first activity in a 0th layer and an activity feature quantity of one or more second activities having the co-occurrence relationship with the first activity by a specified convolution method,
in convolution of an m-th layer (m is an integer of 2 or more), the circuitry generates the convolutional feature quantity of the first activity in the m-th layer by convolving an activity feature quantity of the first activity in an (m−1)th layer and the activity feature quantities of the one or more second activities having the co-occurrence relationship with the first activity by a specified convolution method,
the circuitry generates the convolutional feature quantity of the first activity in the k-th layer in convolution of the k-th layer as the convolutional feature quantity of the one activity based on k-layer convolution, and
the circuitry generates a feature quantity that aggregates the convolutional feature quantities based on the k-layer convolution of all activities included in the activity history information by a specified aggregation method as the activity history feature quantity.

9. The feature extraction device according to claim 2, wherein
each of the activity logs included in the activity history information includes an event flag indicating an execution state of the activity, and
the circuitry extracts the co-occurrence relationship information based on an activity log with which a specified event flag is associated.

10. A method implemented by circuitry of a feature extraction device for extracting a feature quantity indicating a feature related to an execution history of an activity based on the execution history, the feature quantity being input to a state estimation model for estimating a state related to a terminal where the activity is executed, or a user of the terminal, the method comprising:
acquiring activity history information indicating an execution history of the activity in a specified period of time and including time-series activity logs;
extracting co-occurrence relationship information indicating a co-occurrence relationship of activities in a specified period of time based on the activity history information;
aggregating activity feature quantities indicating a feature of each activity based on the co-occurrence relationship information, and generate an activity history feature quantity indicating a feature of the activity history information; and outputting the activity history feature quantity as a feature quantity to be input to the state estimation model, wherein the circuitry generates a feature quantity that aggregates the activity feature quantity of one activity and an activity feature quantity of one or more activities having the co-occurrence relationship with the one activity by a specified convolution method as a convolutional feature quantity of the one activity, and generates a feature quantity that aggregates convolutional feature quantities of all activities included in the activity history information by a specified aggregation method as the activity history feature quantity, wherein the circuitry performs hierarchical convolution of activity feature quantities in a specified number of layers from a first layer to a k-th layer (k is a predetermined integer of 1 or more) based on the co-occurrence relationship information, when each activity of a plurality of activities having a co-occurrence relationship as indicated by the co-occurrence relationship information is a first activity in an n-th layer (n is an integer of 0 or more), the circuitry defines one or more activities having a co-occurrence relationship with the first activity as a second activity, in convolution of the first layer, the circuitry generates the convolutional feature quantity of the first activity in the first layer by convolving an activity feature quantity of the first activity in a 0th layer and an activity feature quantity of one or more second activities having the co-occurrence relationship with the first activity by a specified convolution method, in convolution of an m-th layer (m is an integer of 2 or more), the circuitry generates the convolutional feature quantity of the first activity in the m-th layer by convolving an activity feature quantity of the first activity in an (m−1)th layer and the activity feature quantities of the one or more second activities having the co-occurrence relationship with the first activity by a specified convolution method, the circuitry generates the convolutional feature quantity of the first activity in the k-th layer in convolution of the k-th layer as the convolutional feature quantity of the one activity based on k-layer convolution, and the circuitry generates a feature quantity that aggregates the convolutional feature quantities based on the k-layer convolution of all activities included in the activity history information by a specified aggregation method as the activity history feature quantity.

* * * * *